(12) United States Patent
You et al.

(10) Patent No.: US 10,129,076 B2
(45) Date of Patent: Nov. 13, 2018

(54) PARALLEL FIELDBUS NETWORK-BASED MOTOR CONTROL SYSTEM

(71) Applicant: Center of Human-centered Interaction for Coexistence, Seoul (KR)

(72) Inventors: Bum Jae You, Seoul (KR); Dae Keun Yoon, Seoul (KR); Shin Young Kim, Seoul (KR); Jai Hi Cho, Seoul (KR)

(73) Assignee: Center of Human-centered Interaction for Coexistence, Seoul (KR)

( * ) Notice: Subject to any disclaimer, the term of this patent is extended or adjusted under 35 U.S.C. 154(b) by 148 days.

(21) Appl. No.: 15/233,710

(22) Filed: Aug. 10, 2016

(65) Prior Publication Data

US 2017/0070382 A1 Mar. 9, 2017

(30) Foreign Application Priority Data

Sep. 3, 2015 (KR) ........................ 10-2015-0125158

(51) Int. Cl.
*H04L 12/24* (2006.01)
*H04L 12/26* (2006.01)
*H04L 29/08* (2006.01)
*H04W 4/80* (2018.01)

(52) U.S. Cl.
CPC ...... *H04L 41/0668* (2013.01); *H04L 43/0823* (2013.01); *H04W 4/80* (2018.02); *H04L 67/12* (2013.01)

(58) Field of Classification Search
CPC . H04L 41/0668; H04L 43/0823; H04L 67/12; H04W 4/80
See application file for complete search history.

(56) References Cited

U.S. PATENT DOCUMENTS

| | | | | |
|---|---|---|---|---|
| 4,471,229 A | * | 9/1984 | Plohn | H02P 9/04 290/2 |
| 5,173,899 A | * | 12/1992 | Ballance | H04B 10/272 370/503 |
| 5,752,185 A | * | 5/1998 | Ahuja | H04W 76/10 455/414.1 |
| 7,103,365 B2 | * | 9/2006 | Myllymaki | H04W 4/02 455/456.1 |
| 7,936,708 B2 | * | 5/2011 | Kesavan | H04W 48/18 370/318 |
| 7,983,719 B2 | * | 7/2011 | Abdel-Kader | H04W 48/16 455/574 |
| 8,416,432 B2 | * | 4/2013 | Kim | H04W 76/11 358/1.15 |

(Continued)

*Primary Examiner* — Uzma Alam
(74) *Attorney, Agent, or Firm* — Novick, Kim & Lee, PLLC; Sang Ho Lee

(57) ABSTRACT

Provided is a parallel fieldbus network-based motor control system including one or more slave modules each including a basic processor and an auxiliary processor that control one or more motors, and a master module including at least one master controller that generates command data for controlling each of the one or more motors. The master module further includes a basic network master controller, an auxiliary network master controller and a wireless network master controller, and the slave module includes a basic network slave controller, an auxiliary network slave controller and a wireless network module.

19 Claims, 6 Drawing Sheets

(56) References Cited

U.S. PATENT DOCUMENTS

| | | | | |
|---|---|---|---|---|
| 9,226,328 B2* | 12/2015 | Ren | ............... | H04W 84/20 |
| 9,363,772 B2* | 6/2016 | Burks | ............... | H04W 52/383 |
| 9,398,627 B2* | 7/2016 | Ren | ............... | H04W 60/00 |
| 9,449,498 B2* | 9/2016 | Dina | ............... | G08C 17/02 |
| 9,468,026 B2* | 10/2016 | Hemes | ............... | H04W 76/10 |
| 9,554,290 B2* | 1/2017 | Chu | ............... | H04W 24/04 |
| 9,554,390 B2* | 1/2017 | Gallien | ............... | H04W 72/082 |
| 9,578,561 B2* | 2/2017 | Kapoulas | ............... | H04W 36/0083 |
| 9,590,913 B2* | 3/2017 | Williams | ............... | H04L 47/27 |
| 9,594,384 B2* | 3/2017 | Bergman | ............... | F24F 11/30 |
| 9,713,194 B2* | 7/2017 | Ahluwalla | ............... | H04W 36/0022 |
| 9,872,219 B2* | 1/2018 | Miller-Smith | ............... | H04W 36/30 |
| 9,888,300 B2* | 2/2018 | Stampfl | ............... | B25F 5/00 |
| 2009/0089300 A1* | 4/2009 | Vicente | ............... | H04L 41/0893 |
| 2013/0112673 A1* | 5/2013 | Petrilla | ............... | B23K 9/013 |
| | | | | 219/130.1 |

* cited by examiner

PARALLEL FIELDBUS NETWORK-BASED MOTOR CONTROL SYSTEM

CROSS-REFERENCE TO RELATED APPLICATION

This application claims priority to and the benefit of Korean Patent Application No. 10-2015-0125158, filed on Sep. 3, 2015, the disclosure of which is incorporated herein by reference in its entirety.

BACKGROUND

1. Field of the Invention

The present invention relates to a parallel fieldbus network-based motor control system, and more particularly, to a system which may include one or more slave modules that control one or more motors and correspond to each of the one or more motors, and a master module that generates command data for controlling each of the one or more motors and transmits the generated command data to each of the one or more slave modules, wherein each of the one or more slave modules includes a basic processor and an auxiliary processor, the auxiliary processor acquires the command data from the master module via a basic network, and supports the acquired command data to be stored in a shared memory and transmitted to the basic processor or transmits the acquired command data to the basic processor via a local network, the basic processor controls the motor corresponding to the corresponding slave module in accordance with the command data acquired from the master module via the basic network, read from the shared memory, or transmitted via the local network or supports to control the motor, and supports result data executed in accordance with the command data to be stored in the shared memory and transmitted to the auxiliary processor or transmits the result data to the auxiliary processor via the local network, and when abnormality occurs in the basic network, the maser module provides the command data to the basic processor or the auxiliary processor via an auxiliary network or a wireless network, and the auxiliary processor provides the result data to the master module via the auxiliary network or the wireless network, or acquires command data for continuing to control the motor corresponding to the corresponding slave mode from the master module and supports the acquired command data to be stored in the shared memory and transmitted to the basic processor or transmits the acquired command data to the basic processor via the local network.

2. Discussion of Related Art

A centralized control system has a structure in which a single host device controls and manages all sub units and has been mainly applied to small-scale systems effectively. In such a control structure, control performance may be deteriorated due to an increase in a load on the host device along with an increase in a size of a target system and the whole system may be stopped due to the influence of a failure having occurred in a single constituent component so that reliability of the system may be significantly reduced. In recent years, a distributed control system has been actively studied as an alternative.

The distributed control system is a system that minimizes the influence of a partial failure by distributing control operations for each function, and there is a network-based distributed control system as a representative example of the distributed control system. The network-based distributed control system in which each sub system and a control device are connected via a network may minimize the wiring required to configure a system and have a flexible structure which the network has, thereby increasing scalability of the system. In addition, the network-based distributed control system may unify the management system of a system via a network, thereby increasing operability of the system.

As an example, control devices may be connected to a network-based distributed motor control system via a network so that the network-based distributed motor control system may control a plurality of driving units constituting automation equipment, robots, IoT (Internet of Things), etc. In particular, the network-based distributed motor control system has been widely used in a CAN (controller area network), an RS-485 network, and the like in the way that it can be installed for each joint of a robot, easily managed, and miniaturized. In recent years, EtherCAT network technology that supports a rate of 100 Mbps in order to ensure a high control rate of 1 KHz or higher has been applied even to a motor control system that drives several tens of motors or more at the same time.

However, in the motor control system including an EtherCAT network, a plurality of nodes are connected to a single network in the form of a daisy chain, so that the entire control system cannot be operated normally when a malfunction or a failure occurs in a single network node among the plurality of nodes.

As a result, the present inventor has invented a motor control system which may continue to control the corresponding motor through a basic network and a separate auxiliary network or wireless network when a malfunction in a network node occurs while controlling each motor based on the basic network, so that the entire control system may maintain unique function and performance.

Meanwhile, a conventional motor control system generally controls a motor while focusing on speed and position control of the motor, but due to emergence of application fields in which even current control is further performed, stable control mode switching among control modes of the motor control system such as a position control mode, a speed control mode, and a current control mode has recently become an important issue.

Therefore, the present inventor has invented control technology capable of stably operating a motor without sudden discontinuous movement or impact when switching the control mode.

SUMMARY OF THE INVENTION

The present invention is directed to a motor control system which may solve the above-described problems.

In addition, the present invention is also directed to a motor control system which may continue to control the corresponding motor through a basic network and a separate auxiliary network or wireless network when a malfunction in a network node occurs while controlling each motor based on the basic network, so that the entire control system may maintain unique function and performance.

In addition, the present invention is also directed to a motor control system which may control a different slave module other than a specific slave module for controlling a specific motor in consideration of status information of the specific motor when a failure occurs in internal components of the specific slave module, thereby minimizing damage to the system caused by a malfunction of the specific motor.

In addition, the present invention is also directed to a motor control system which may control and monitor a motor in real time through connection with an IoT (Internet of Things) infrastructure wireless network, and perform remote control through a mobile device.

In addition, the present invention is also directed to a motor control system which may perform bumpless switching capable of stably operating a motor without sudden discontinuous movement or impact when switching a control mode.

According to an aspect of the present invention, there is provided a parallel fieldbus network-based motor control system including: one or more slave modules that control one or more motors and correspond to each of the one or more motors; and a master module that generates command data for controlling each of the one or more motors and transmits the generated command data to each of the one or more slave modules, wherein each of the one or more slave modules includes a basic processor and an auxiliary processor, the auxiliary processor acquires the command data from the master module via a basic network, and supports the acquired command data to be stored in a shared memory and transmitted to the basic processor or transmits the acquired command data to the basic processor via a local network, the basic processor controls the motor corresponding to the corresponding slave module in accordance with the command data acquired from the master module via the basic network, read from the shared memory, or transmitted via the local network or supports to control the motor, and supports result data executed in accordance with the command data to be stored in the shared memory and transmitted to the auxiliary processor or transmits the result data to the auxiliary processor via the local network, and when abnormality occurs in the basic network, the maser module provides the command data to the basic processor or the auxiliary processor via an auxiliary network or a wireless network, and the auxiliary processor provides the result data to the master module via the auxiliary network or the wireless network, or acquires command data for continuing to control the motor corresponding to the corresponding slave mode from the master module and supports the acquired command data to be stored in the shared memory and transmitted to the basic processor or transmits the acquired command data to the basic processor via the local network.

According to another aspect of the present invention, there is provided a parallel fieldbus network-based motor control system including: one or more slave modules that control one or more motors and correspond to each of the one or more motors; and a master module that generates command data for controlling each of the one or more motors and transmits the generated command data to each of the one or more slave modules, wherein each of the one or more slave modules includes a basic processor and an auxiliary processor, the basic processor acquires the command data from the master module via a basic network and controls the motor corresponding to the corresponding slave module or supports to control the motor, provides result data executed in accordance with the command data to the master module via the basic network, and supports the result data to be stored in a shared memory and transmitted to the auxiliary processor or transmits the result data to the auxiliary processor via a local network, and when abnormality occurs in the basic network, the master module provides the command data to the auxiliary processor via an auxiliary network or a wireless network, and the auxiliary processor provides the result data read from the shared memory or transmitted via the local network to the master module via the auxiliary network or the wireless network or acquires command data for continuing to control the motor corresponding to the corresponding slave module from the master module via the auxiliary network or the wireless network, and continues to control the motor corresponding to the corresponding slave module or supports to control the motor.

According to still another aspect of the present invention, there is provided a parallel fieldbus network-based motor control system including: one or more slave modules that control one or more motors and correspond to each of the one or more motors; and a master module that generates command data for controlling each of the one or more motors and transmits the generated command data to each of the one or more slave modules, wherein each of the one or more slave modules includes a network processor and a motor control processor, the network processor acquires the command data from the master module via a basic network, and supports the acquired command data to be stored in a shared memory and transmitted to the motor control processor or transmits the acquired command data to the motor control processor via a local network, the motor control processor controls the motor corresponding to the corresponding slave module in accordance with the command data read from the shared memory or transmitted via the local network or supports to control the motor, and supports result data executed in accordance with the command data to be stored in the shared memory and transmitted to the network processor or transmits the result data to the network processor via the local network, and when abnormality occurs in the basic network, the maser module provides the command data to the motor control processor or the network processor via an auxiliary network or a wireless network, and the network processor provides the result data to the master module via the auxiliary network or the wireless network, or acquires command data for continuing to control the motor corresponding to the corresponding slave mode from the master module and supports the acquired command data to be stored in the shared memory and transmitted to the motor control processor or transmits the acquired command data to the motor control processor via the local network.

According to yet another aspect of the present invention, there is provided a parallel fieldbus network-based motor control system including: one or more slave modules that control one or more motors and correspond to each of the one or more motors; and a master module that generates command data for controlling each of the one or more motors and transmits the generated command data to each of the one or more slave modules, wherein each of the one or more slave modules is connected to the master module via a basic network and an auxiliary network, and includes a basic processor and an auxiliary processor, the auxiliary processor acquires the command data from the master module via the basic network and supports the acquired command data to be stored in a shared memory and transmitted to the basic processor or transmits the command data to the basic processor via a local network, the basic processor controls the motor corresponding to the corresponding slave module in accordance with the command data acquired from the master module via the basic network, read from the shared memory, or transmitted via the local network or supports to control the motor, and supports result data executed in accordance with the command data to be stored in the shared memory and transmitted to the auxiliary processor or transmits the result data to the auxiliary processor via the local network, and when abnormality occurs in the basic network, the master module provides the command data to the basic processor or the auxiliary processor via the auxiliary network, and the auxiliary processor provides the result data to the master module via the auxiliary network or acquires command data for continuing to control the motor corresponding to the corresponding slave module from the master module via the auxiliary network, and supports the acquired command data to be stored in the shared memory and transmitted to the basic processor or transmits the acquired command data to the basic processor via the local network.

According to yet another aspect of the present invention, there is provided a parallel fieldbus network-based motor control system including: one or more slave modules that control one or more motors and correspond to each of the one or more motors; and a master module that generates command data for controlling each of the one or more motors and transmits the generated command data to each of the one or more slave modules, wherein each of the one or more slave modules is connected to the master module via a basic network and a wireless network, and includes a basic processor and an auxiliary processor, the auxiliary processor acquires the command data from the master module via the basic network and supports the acquired command data to be stored in a shared memory and transmitted to the basic processor or transmits the command data to the basic processor via a local network, the basic processor controls the motor corresponding to the corresponding slave module in accordance with the command data acquired from the master module via the basic network, read from the shared memory, or transmitted via the local network or supports to control the motor, and supports result data executed in accordance with the command data to be stored in the shared memory and transmitted to the auxiliary processor or transmits the result data to the auxiliary processor via the local network, and when abnormality occurs in the basic network, the master module provides the command data to the basic processor or the auxiliary processor via the wireless network, and the auxiliary processor provides the result data to the master module via the wireless network or acquires command data for continuing to control the motor corresponding to the corresponding slave module from the master module via the wireless network, and supports the acquired command data to be stored in the shared memory and transmitted to the basic processor or transmits the acquired command data to the basic processor via the local network.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
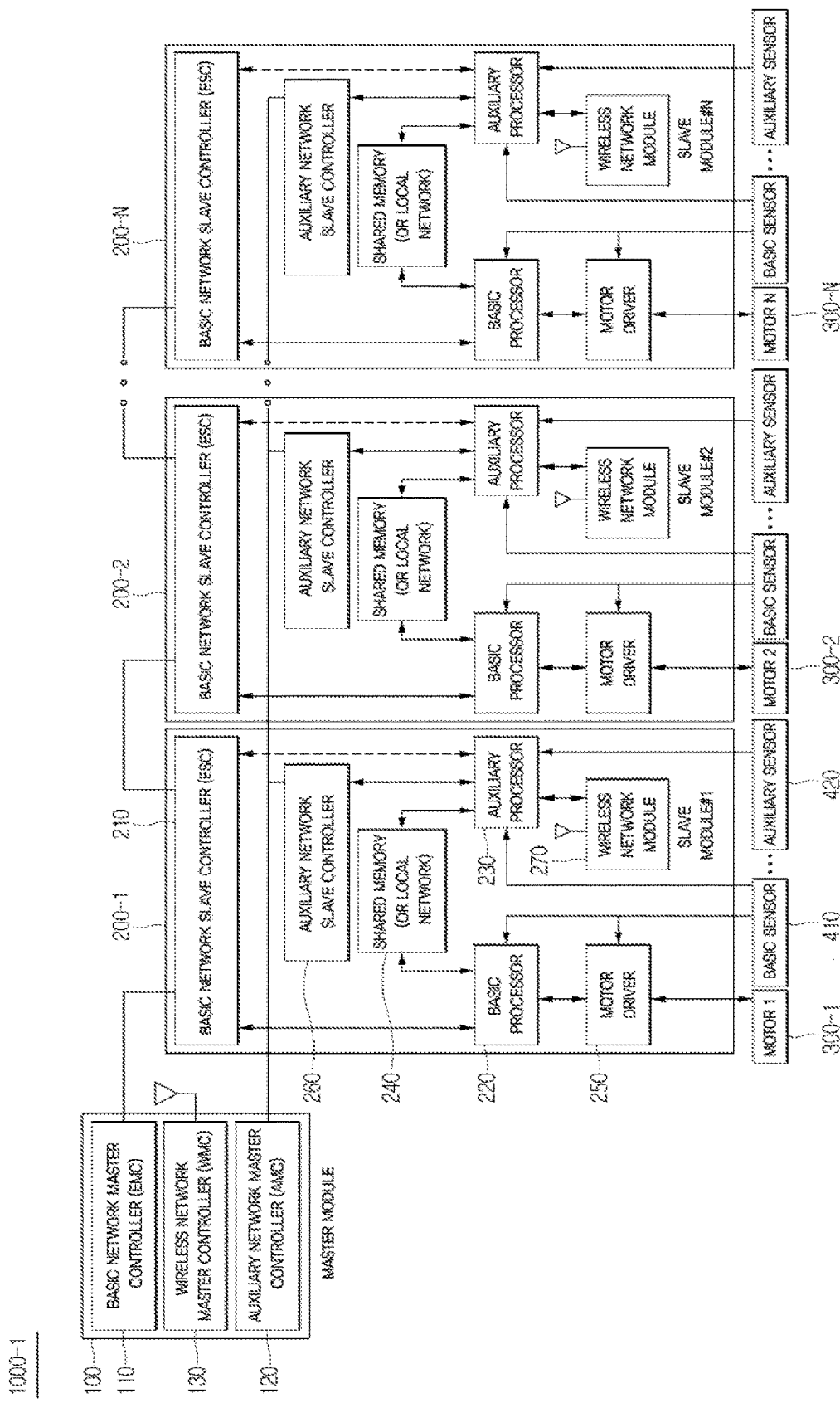
FIG. 1 is a block diagram illustrating constituent components of a motor control system according to an embodiment of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the present invention. Also, it is to be understood that the positions or arrangements of individual elements in the embodiment may be changed without separating from the spirit and scope of the present invention. The following detailed description is, therefore, not to be taken in a limiting sense, and the scope of the present invention is defined only by the appended claims that should be appropriately interpreted along with the full range of equivalents to which the claims are entitled. In the drawings, like reference numerals identify like or similar elements or functions through the several views.

FIG. 1 is a block diagram illustrating constituent components of a motor control system according to an embodiment of the present invention.

Referring to FIG. 1, a motor control system 1000-1 according to an embodiment of the present invention includes a master module 100 and one or more slave modules 200-1, 200-2, . . . , and 200-N.

The master module 100 is a component that controls each of one or more motors 300-1, 300-2, . . . , and 300-N through each of the one or more slave modules 200-1, 200-2, . . . , and 200-N connected via a network. Specifically, the master module 100 may generate command data for controlling each of the one or more motors 300-1, 300-2, . . . , and 300-N connected to the one or more slave modules 200-1, 200-2, . . . , and 200-N, and transmit the generated command data to each of the one or more slave modules 200-1, 200-2, . . . , and 200-N via the network. In addition, the master module 100 may determine whether abnormality occurs in a basic network or internal components included in each of the one or more slave modules 200-1, 200-2, . . . , and 200-N as will be described later, and control the corresponding motor via an auxiliary network or a wireless network based on the determination result or control a different slave module in consideration of status information of the corresponding motor. Specific description thereof will be made later. As illustrated in FIG. 1, the master module 100 may include a basic network master controller 110, an auxiliary network master controller 120, and a wireless network master controller 130. Hereinafter, an example in which the master module 100 includes both the auxiliary network master controller 120 and the wireless network master controller 130 will be described, but the master module 100 may include either the auxiliary network master controller 120 or the wireless network master controller 130. When the master module 100 includes either the auxiliary network master controller 120 or the wireless network master controller 130, each of the one or more slave modules 200-1, 200-2, . . . , and 200-N which will be described later may include either an auxiliary network slave controller 260 or a wireless network module 270.

The basic network master controller 110 transmits the command data to each of the one or more slave modules 200-1, 200-2, . . . , and 200-N via the basic network. Here, the basic network is a high-speed network that connects the master module 100 and each of the one or more slave modules 200-1, 200-2, . . . , and 200-N. For example, the basic network may be a high-speed fieldbus-based EtherCAT network. The EtherCAT network may provide a high communication speed of 100 Mbps or higher. When the basic network is the EtherCAT network, the basic network master controller 110 may be an EMC (EtherCAT master controller).

The auxiliary network master controller 120 transmits the command data to each of the one or more slave modules 200-1, 200-2, . . . , and 200-N via the auxiliary network. Here, the auxiliary network may connect the master module 100 and each of the one or more slave modules 200-1, 200-2, . . . , and 200-N, and transmit the command data. The auxiliary network may be a low-speed fieldbus-based network. For example, the auxiliary network may be a network utilizing a low-speed fieldbus such as a CAN (controller area network) or an RS-485 network.

The wireless network master controller 130 transmits the command data to each of the one or more slave modules 200-1, 200-2, . . . , and 200-N via the wireless network. Here, the wireless network may connect the master module 100 and each of the one or more slave modules 200-1, 200-2, . . . , and 200-N in a wireless manner, and transmit the command data. The wireless network may be implemented by technologies such as Wi-Fi, WCDMA (wideband CDMA), mobile WiMAX, WiBro, LTE (long term evolution), Bluetooth LE, Zigbee, and the like.

In addition, as illustrated in FIG. 1, each of the one or more slave modules 200-1, 200-2, . . . , and 200-N may include a basic network slave controller 210, a basic processor 220, an auxiliary processor 230, a shared memory 240, a motor driver 250, the auxiliary network slave controller 260, and the wireless network module 270.

The basic processor 220 is a component that controls a motor corresponding to the corresponding slave module using the command data acquired via the network, or supports the control of the motor. Specifically, the basic processor 220 may acquire the command data from the master module 100 via the basic network and control the motor corresponding to the corresponding slave module, or support the motor driver 250 to control the motor. In addition, when the auxiliary processor 230 acquires the command data from the master module 100 via the basic network, the basic processor 220 may read the command data having received by the auxiliary processor 230 from the shared memory 240 to be described later or receive the command data via a local network and control the motor corresponding to the corresponding slave module, or support the motor driver 250 to control the motor. Next, the basic processor 220 may support result data executed according to the command data to be stored in the shared memory 240 and transmitted to the auxiliary processor 230, or transmit the result data to the auxiliary processor 230 via the local network.

Here, the result data is information indicating results obtained by controlling the motor corresponding to the corresponding slave module, and may be sensor information acquired in a predetermined time interval from a basic sensor 410. When each of the one or more slave modules 200-1, 200-2, . . . , and 200-N is configured as a multi-core processor, the basic processor 220 may be a single core constituting a multi-core. In addition, the basic processor 220 may be implemented by a DSP (digital signal processor).

The basic network slave controller 210 is a component that receives the command data from the basic network master controller 110 via the basic network and transmits the received command data to the basic processor 220 or the auxiliary processor 230. Specifically, when abnormality does not occur in the basic network, the basic network slave controller 210 may receive the command data from the basic network master controller 110 via the basic network and transmit the received command data to the basic processor 220, transmit the command data to the auxiliary processor 230 and support the auxiliary processor 230 to store the command data in the shared memory 240 and transmit the command data to the basic processor 220, or support the auxiliary processor 230 to transmit the command data to the basic processor 220 via the local network. Next, the basic network slave controller 210 may transmit result data acquired from the basic processor 220 to the basic network master controller 110. In addition, the basic network slave controller 210 may acquire information for determining whether abnormality occurs in the basic network. This will be described later. When the basic network is an EtherCAT network, the basic network slave controller 210 may be an ESC (EtherCAT slave controller).

Meanwhile, the basic network slave controller 210 may perform communication with either the basic processor 220 or the auxiliary processor 230. In FIG. 1, dotted lines indicate that communication with the auxiliary processor 230 may be variable.

The auxiliary processor 230 is a component that acquires the command data via the auxiliary network or the wireless network when abnormality occurs in the basic network and supports the basic processor 220 to continue to control the motor corresponding to the corresponding slave module. The auxiliary processor 230 may acquire the command data from the master module 100 via the basic network and support the acquired command data to be stored in the shared memory 240 and transmitted to the basic processor 220, or transmit the command data to the basic processor 220 via the local network.

In addition, when abnormality occurs in the basic network, the auxiliary processor 230 may provide result data read from the shared memory 240 or received via the local network to the master module 100 via the auxiliary network or the wireless network, or acquire the command data for continuing to control the motor corresponding to the corresponding slave module via the auxiliary network or the wireless network from the master module 100 and support the acquired command data to be stored in the shared memory 240 and transmitted to the basic processor 220 or transmit the command data to the basic processor 220 via the local network and support the basic processor 220 to control the motor corresponding to the corresponding slave module. That is, when abnormality occurs in the basic network, the auxiliary processor 230 may read result data indicating results obtained by controlling the motor corresponding to the corresponding slave module which have been stored in the shared memory 240 by the basic processor 220 or receive the result data from the basic processor 220 via the local network, and transmit the read or received result data to the master module 100 via the auxiliary network or the wireless network. The master module 100 may determine a current status of the motor corresponding to the corresponding slave module through the result data. The auxiliary processor 230 may acquire the command data for continuing to control the motor corresponding to the corresponding slave module from the master module 100 via the auxiliary network or the wireless network and support the acquired command data to be stored in the shared memory 240 and transmitted to the basic processor 220, or transmit the command data to the basic processor 220 via the local network, thereby supporting the basic processor 220 to continue to control the motor corresponding to the corresponding slave module. In addition, the auxiliary processor 230 may acquire status information of the motor corresponding to the corresponding slave module from the basic sensor 410 or an auxiliary sensor 420 in a predetermined time interval. When each of the one or more slave modules 200-1, 200-2, . . . , and 200-N is configured as a multi-core processor, the auxiliary processor 230 may be a single core constituting a multi-core. When using the multi-core processor in this manner, a function for controlling a motor and a function for controlling a network may be independently implemented in each core, which leads to a reduction in mutual operational interference, thereby improving driving performance and stability of the whole system. The auxiliary processor 230 may be implemented by a DSP.

The shared memory 240 is a space that stores data which each of the basic processor 220 and the auxiliary processor 230 may commonly access and read. In the shared memory 240, the command data received by the basic processor 220 or the auxiliary processor 230 from the master module 100, the result data executed according to the command data, and the like may be stored. The result data may include result information obtained by processing the command data by the basic processor 220 or status information of the motor corresponding to the corresponding slave module acquired through the basic sensor 410 or the auxiliary sensor 420. For example, the shared memory 240 may store current position data of the motor acquired through the basic sensor 410 as the result data. In addition, the shared memory 240 may store an interrupt flag, a global time, and the like.

Meanwhile, instead of sharing data through the shared memory 240 as described above, data may be transmitted and received between the basic processor 220 and the auxiliary processor 230 via the local network. The local network may be connected by an I²C (inter-integrated circuit) bus or an SPI (serial peripheral interface) bus.

In addition, when each of the one or more slave modules 200-1, 200-2, . . . , and 200-N has a memory corresponding to the basic processor 220 and a memory corresponding to the auxiliary processor 230, the basic processor 220 and the auxiliary processor 230 may transmit the above-described command data or result data via the local network, and store the transmitted command data or result data in the memory corresponding to the opposite processor. Here, the "memory corresponding to the processor" does not mean a memory necessarily included in the processor, and may be a concept including a memory that is organically related and operable and also including a memory stored for a short time such as a cache memory.

As described above, the basic processor 220 and the auxiliary processor 230 share data through the shared memory or transmit and receive data via the local network, but this is merely an example, and the basic processor 220 and the auxiliary processor 230 may share data through a variety of technical means.

The motor driver 250 may receive control data from the basic processor 220, control a torque, a speed, a position, and the like of the motor corresponding to the corresponding slave module, and drive the motor.

The auxiliary network slave controller 260 is a component that receives the command data from the auxiliary network master controller 120 via the auxiliary network or transmits the result data to the auxiliary network master controller 120. As an example, when abnormality occurs in the basic network, the auxiliary network slave controller 260 may receive the command data from the auxiliary network master controller 120 via the auxiliary network and support the auxiliary processor 230 to store the command data in the shared memory 240 and transmit the stored command data to the basic processor 220, or support the auxiliary processor 230 to transmit the command data to the basic processor 220 via the local network. In addition, the auxiliary network slave controller 260 may transmit the result data read from the shared memory 240 or acquired from the basic processor 220 via the local network to the auxiliary network master controller 120 via the auxiliary network. In addition, even when the basic network is operated normally, the auxiliary network slave controller 260 may transmit the result data or sensor data acquired from the sensors 410 and 420 to the auxiliary network master controller 120, and support the auxiliary network master controller 120 to monitor an operating status of the motor. Even in this case, the auxiliary network slave controller 260 may support the auxiliary processor 230 to store the command data in the shared memory 240 and transmit the stored command data to the basic processor 220, as necessary, or support the auxiliary processor 230 to transmit the command data to the basic processor 220 via the local network. In addition, as will be described later, the auxiliary network slave controller 260 may acquire information for determining whether abnormality occurs in the auxiliary network.

The wireless network module 270 is a component that receives the command data from the wireless network master controller 130 via the wireless network or transmit the result data to the wireless network master controller 130. As an example, when abnormality occurs in the basic network, the wireless network module 270 may receive the command data from the wireless network master controller 130 via the wireless network and support the auxiliary processor 230 to store the received command data in the shared memory 240 and transmit the stored command data to the basic processor 220, or support the auxiliary processor 230 to transmit the command data to the basic processor 220 via the local network. In addition, the wireless network module 270 may transmit the result data read from the shared memory 240 or acquired from the basic processor 220 via the local network to the wireless network master controller 130 via the wireless network. In addition, even when the basic network is operated normally, the wireless network module 270 may transmit the result data or the sensor data acquired from the sensors 410 and 420 to the wireless network master controller 130 and support the wireless network master controller 130 to monitor an operating status of the motor. Even in this case, the wireless network module 270 may support the auxiliary processor 230 to store the command data in the shared memory 240 and transmit the stored command data to the basic processor 220, as necessary, or support the auxiliary processor 230 to transmit the command data to the basic processor 220 via the local network.

Meanwhile, each of the above-described basic network slave controller 210, auxiliary network slave controller 260, wireless network module 270, shared memory 240, basic processor 220, auxiliary processor 230, motor driver 250, and the like may be configured as a single SOC (system on chip), or may be respectively implemented as a separate chip.

Hereinafter, an abnormality diagnosis method and responding method of the motor control system 1000-1 according to an embodiment of the present invention will be described in detail.

The motor control system 1000-1 according to an embodiment of the present invention may diagnose whether abnormality occurs in a network, internal components of a slave module, a motor, a sensor, and the like independently using a diagnosis method 1-1 and/or a diagnosis method 1-2.

First, the diagnosis method 1-1 will be described.

The diagnosis method 1-1 is a method of determining whether abnormality occurs in the basic network according to a self-diagnosis method of the motor control system 1000-1. Specifically, the basic network slave controller 210 may periodically check a data transmission/reception status or the like, and set a flag indicating occurrence and nonoccurrence of abnormality in the basic network. When the master module 100 acquires flag information indicating the occurrence of abnormality in the basic network from the basic network slave controller 210, it may be determined that abnormality occurs in the basic network connected to the corresponding slave module. As an example, when the basic network slave controller 210 is implemented by an ESC (EtherCAT slave controller), occurrence and nonoccurrence of abnormality in the basic network may be determined using a self-diagnosis function of the ESC. Here, the flag information may be at least one of physical link status check information, lost link counter check information, stable communication status check information, frame corruption diagnostics information, command processing diagnostics information, state machine diagnostics information, and DC synchronization diagnostics information.

In addition, when initialization of the basic network is not performed within a predetermined time or the basic network master controller 110 does not receive predetermined data in a predetermined time interval from the basic network slave controller 210 even though the flag information indicating the occurrence of abnormality in the basic network is not acquired from the basic network slave controller 210, the master module 100 may determine that abnormality occurs in the basic network connected to the corresponding slave module. However, even when the basic network slave controller 210 is failed, the initialization of the basic network may not be performed or data reception from the basic network slave controller 210 may not be performed, and therefore in this case, it may be determined that the basic network slave controller 210 is failed. In addition, when data received from the same slave module is the same as a specific value for a predetermined time period or more or when data received from mutually different slave modules is the same as a specific value for a predetermined time period or more, it may be determined that data is not properly received from the basic processor 220 or the auxiliary processor 230 or the received data is not properly transmitted, and therefore this may be determined that the basic network slave controller 210 is failed.

Figure 2:
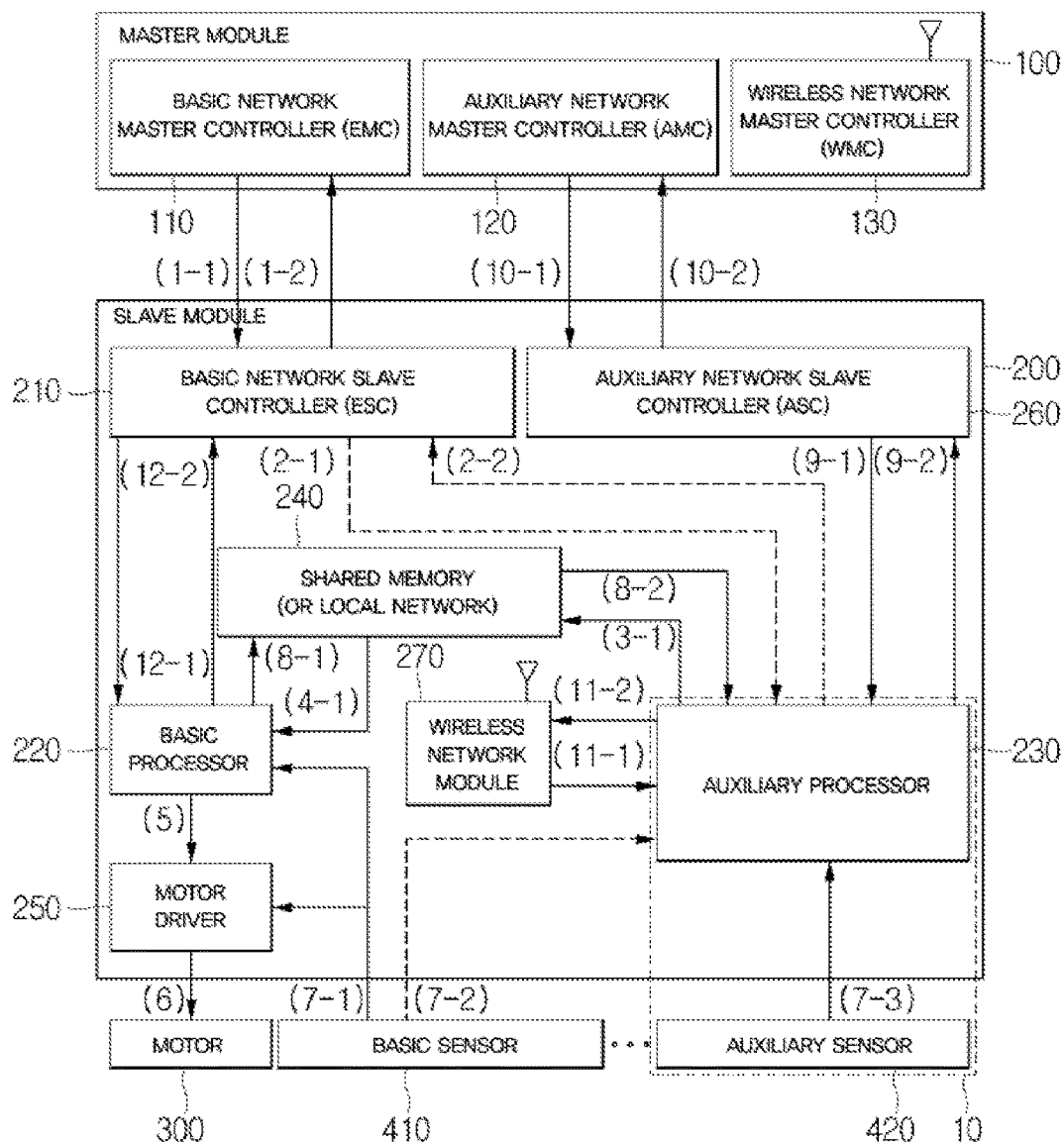
FIG. 2 illustrates a control flow between a master module and a specific slave module of a motor control system according to an embodiment of the present invention.

FIG. 2 illustrates a control flow between a master module of a motor control system according to an embodiment of the present invention and a specific slave module.

Hereinafter, a case in which abnormality occurs in the basic network will be mainly described, but a case in which abnormality occurs in the basic network slave controller 210 may correspond in accordance with the abnormality in the basic network.

Referring to FIG. 2, when abnormality occurs in the basic network connecting the master module 100 of the motor control system 1000-1 according to an embodiment of the present invention and a specific slave module, first, the basic network master controller 110 may stop transmission of the command data via the basic network. That is, the basic network master controller 110 may interrupt connection of (1-1) and (1-2) shown in FIG. 2. Next, the auxiliary network master controller 120 or the wireless network master controller 130 may receive result data read from the shared memory 240 or transmitted from the basic processor 220 via the local network, from the auxiliary network slave controller 260 or the wireless network module 270 via the auxiliary network or the wireless network ((8-2)→(9-2)→(10-2) or (8-2)→(11-2)). At this time, status information of a motor 300 corresponding to the corresponding slave module acquired through the basic sensor 410 may be transmitted to the basic processor 220 ((7-1)) and stored in the shared memory 240 as result data ((7-1)→(8-1)). Unlike this, the status information of the motor 300 may be transmitted directly to the auxiliary processor 230 from the basic sensor 410. Next, the auxiliary network master controller 120 or the wireless network master controller 130 may transmit command data for continuing to control the motor 300 corresponding to the corresponding slave module which has been generated based on the result data, to the auxiliary network slave controller 260 or the wireless network module 270 ((10-1)), and thereby support the basic processor 220 to continue to control the motor 300 corresponding to the corresponding slave module or support the basic processor 220 to control the motor 300 ((9-1)→(3-1)→(4-1)→(5)→(6) or (11-1)→(3-1)→(4-1)→(5)→(6)).

For example, a case in which the basic network master controller 110 transmits command data for rotating the motor corresponding to the corresponding slave module by 10 degrees to the basic network slave controller 210 via the basic network ((1-1)) is considered. The basic processor 220 may receive the command data from the basic network slave controller 210 ((11-1)), and control the motor corresponding to the corresponding slave module or support to control the motor ((5)→(6)). Unlike this, the basic processor 220 may support the auxiliary processor 230 to receive the command data from the basic network slave controller 210 ((2-1)), to store the received command data in the shared memory 240, and to transmit the stored command data to the basic processor 220, or transmit the command data to the basic processor 220 via the local network so that the basic processor 220 may control the motor corresponding to the corresponding slave module or support the control of the motor ((3-1)→(4-1)→(5)→(6)). The basic processor 220 may acquire status information (for example, information indicating that the motor is currently rotated by 5 degrees) of the motor through the basic sensor 410 in real time ((7-1)), and support the acquired status information to be stored in the shared memory 240 as result data executed according to the command data and to be transmitted to the auxiliary processor 230 or transmit the command data to the auxiliary processor 230 via the local network ((8-1)→(8-2)). When abnormality occurs in the basic network, the auxiliary processor 230 may read result data indicating that the motor corresponding to the corresponding slave module is rotated by 5 degrees from the shared memory 240 or receive the result data via the local network, and transmit the read or received result data to the auxiliary network slave controller 260 or the wireless network module 270 ((9-2) or (11-2)). The auxiliary network slave controller 260 or the wireless network module 270 may transmit the result data to the auxiliary network master controller 120 or the wireless network master controller 130 ((10-2)). The auxiliary network master controller 120 or the wireless network master controller 130 may determine that the motor corresponding to the corresponding slave module should be further rotated by 5 degrees (this determination may be performed by another component of the master module 100) because original command data is used for rotating the motor by 10 degrees, and transmit new command data for further rotating the motor corresponding to the corresponding slave module by 5 degrees via the auxiliary network or the wireless network to the auxiliary network slave controller 260 or the wireless network module 270 ((10-1)). Next, the auxiliary network slave controller 260 or the wireless network module 270 may transmit the received new command data to the auxiliary processor 230 ((9-1) or (11-1)). The auxiliary processor 230 may support the new command data to be stored in the shared memory 240 and transmitted to the basic processor 220, or transmit the new command data to the basic processor 220 via the local network ((3-1)→(4-1)) and support the basic processor 220 to control an operation for further rotating the motor by 5 degrees ((5)→(6)). New status information of the motor may be acquired through the basic sensor 410, transmitted to the basic processor 220 or the auxiliary processor 230 ((7-1) or (7-2)), and stored in the shared memory 240 as result data so that the stored status information may be read by the auxiliary processor 230 or transmitted to the auxiliary processor 230 via the local network ((8-1)→(8-2)). Next, the stored status information of the motor may be transmitted to the auxiliary network slave controller 260 or the wireless network module 270, and transmitted to the auxiliary network master controller 120 or the wireless network master controller 130 via the auxiliary network or the wireless network ((9-2)→(10-2) or (11-2)).

However, when abnormality occurs in the basic network in this manner, the master module 100 may determine whether abnormality occurs in the auxiliary network connecting the corresponding slave module and the auxiliary network master controller 120 and the wireless network connecting the corresponding slave module and the wireless network master controller 130, without continuing to control the motor corresponding to the corresponding slave module via the auxiliary network or the wireless network. At this time, when abnormality does not occur in the auxiliary network or the wireless network, the command data may be transmitted in the same method as the above-described method via the network determined that abnormality does not occur, and when abnormality occurs in the auxiliary network and the wireless network, a user may be notified of the occurrence of abnormality in the network. This is because repair is required due to the occurrence of abnormality in all of the basic network, the auxiliary network, and the wireless network. A method of determining whether abnormality occurs in the auxiliary network will be described later.

Hereinafter, the diagnosis method 1-2 for the motor control system 1000-1 according to an embodiment of the present invention will be described.

The diagnosis method 1-2 for the motor control system 1000-1 according to an embodiment of the present invention is a method of diagnosing the basic network or the like via the auxiliary network or the wireless network. Here, the reliability of the auxiliary network, the wireless network, and the auxiliary processor 230 should be verified preferentially, and therefore whether abnormality occurs in the auxiliary network, the wireless network, and the auxiliary processor 230 may be diagnosed. That is, the master module 100 may diagnose whether abnormality occurs in the auxiliary network, the wireless network, or the auxiliary processor 230, and when it is determined that abnormality does not occur in the auxiliary network or the wireless network and in the auxiliary processor 230 based on the diagnosis result, the master module 100 may determine whether abnormality occurs in the basic network via the network determined that abnormality does not occur.

The master module 100 may determine whether abnormality occurs in the auxiliary network through similar technology to the above-described diagnosis method 1-1. That is, the master module 100 may determine whether abnormality occurs in the auxiliary network according to a self-diagnosis method of the motor control system 1000-1. Specifically, when acquiring flag information indicating the occurrence of abnormality in the auxiliary network from the auxiliary network slave controller 260, the master module 100 may determine that abnormality occurs in the auxiliary network connected to the corresponding slave module. Here, the flag information may be at least one of parity bit information, CRC (cyclic redundancy check) information, and acknowledge error information.

In addition, the master module 100 may periodically transmit command data for requesting a reply of ID from a specific slave module to the auxiliary network slave controller 260 via the auxiliary network, and determine that abnormality occurs in the auxiliary network when the ID is not received from the specific slave module within a predetermined time.

Figure 3:
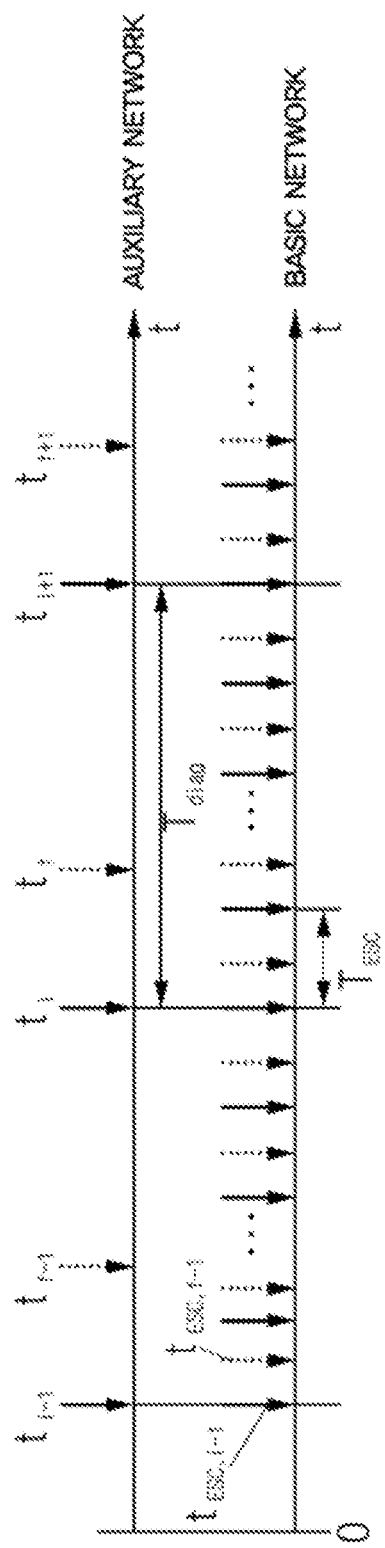
FIG. 3 is a network time diagram illustrating a relationship among a data transmission and reception time of a basic network and an auxiliary network, a failure diagnosis period, and a communication control period via a basic network.

FIG. 3 is a network time diagram illustrating a relationship among a data transmission and reception time of a basic network and an auxiliary network, a failure diagnosis period $T_{diag}$, and a communication control period $T_{ESC}$ via a basic network.

Referring to FIG. 3, it can be seen that a difference between a time $t_i$ during which command data is transmitted from the auxiliary network master controller 120 to the auxiliary network slave controller 260 via the auxiliary network and a time $t_{i+1}$ during which command data is subsequently transmitted to the auxiliary network slave controller 260 is the same as the failure diagnosis period $T_{diag}$. Here, $t_f$ denotes a time during which result data is transmitted from the auxiliary network slave controller 260 to the auxiliary network master controller 120 via the auxiliary network. Similarly, it can be seen that a difference between a time $t_{ESC,\ i}$ during which command data is transmitted from the basic network master controller 110 to the basic network slave controller 210 via the basic network and a time $t_{ESC,\ i+1}$ during which command data is subsequently transmitted to the basic network slave controller 210 is the same as the communication control period $T_{ESC}$ of the basic network. Here, $t_{ESC,f}$ denotes a time during which result data is transmitted from the basic network slave controller 210 to the basic network master controller 110 via the basic network. In addition, as illustrated in FIG. 3, it can be seen that communication via the basic network has short communication control period $t_{ESC}$ and high communication frequency because its main purpose is motor control, whereas communication via the auxiliary network has relatively long failure diagnosis period $T_{diag}$ and low communication frequency because its main purpose is failure diagnosis.

At this time, when the following Equation 1 is satisfied, the master module 100 may determine that abnormality occurs in the auxiliary network or the auxiliary processor 230.

$$((t_f - t_i) > T_{diag}) \&\& (|t_f - t_{f-1}| - T_{diag}| > \varepsilon_{AN}) \quad \text{Equation 1:}$$

In addition, when the following Equation 2 is satisfied, the master module 100 may determine that abnormality occurs in the auxiliary processor 230.

$$|\Delta n_{TS,AM} * T_{TS,AM} - T_{diag}| > \varepsilon_{TS} \qquad \text{Equation 2:}$$

Here, $$n_{TS,AM} = n_{TS,AM,f} - n_{TS,AM,f-1},$$

$n_{TS,AM,f}$: a time stamp count value of the auxiliary processor 230 transmitted to the master module 100 when t=f is satisfied, $\varepsilon_{TS}$: a maximum error between a communication period calculated using a time stamp of the auxiliary processor 230 and a communication period of an auxiliary network, and $\varepsilon_{AN}$: a maximum error range between a transmission period and a reception period of the auxiliary network.

In the auxiliary processor 230, the time stamp count $n_{TS,AM}$ may be increased for each predetermined period $T_{TS,AM}$.

When abnormality occurs in the auxiliary network or the auxiliary processor 230 based on the above-described diagnosis result, the master module 100 may output a message for notifying a user of the occurrence of abnormality in the auxiliary network or the auxiliary processor 230. In addition, when abnormality occurs even in the basic network as described above, the master module 100 may stop the operation of the corresponding slave module. In this case, replacement of the defective device may be made.

Meanwhile, as to the diagnosis method 1-2, whether abnormality occurs in the basic network may be determined in consideration of a comparison result between result data provided to the basic network master controller 110 via the basic network and result data provided to the auxiliary network master controller 120 or the wireless network master controller 130 via the auxiliary network or the wireless network, as will be described below, and the occurrence and nonoccurrence of abnormality in the basic network may not be accurately determined when abnormality occurs in the basic processor 220. For reference, when abnormality does not occur in the auxiliary network or the wireless network and in the auxiliary processor 230 based on the diagnosis result of the diagnosis method 1-2, the master module 100 may determine whether abnormality occurs in the basic processor 220 via the network determined that abnormality does not occur.

The occurrence and nonoccurrence of abnormality in the basic processor 220 may be determined based on whether the following Equation 3 is satisfied. That is, when the following Equation 3 is satisfied, it may be determined that abnormality occurs in the basic processor 220.

$$|\Delta n_{TS,MM} * T_{TS,MM} - T_{diag}| > \varepsilon_{TS} \qquad \text{Equation 3:}$$

Here, $T_{diag}$: a failure diagnosis period, $$n_{TS,MM} = n_{TS,MM,f} - n_{TS,MM,f-1},$$

$n_{TS,MM,f}$: a time stamp count value of the basic processor 220 transmitted to the master module 100 when t=$t_f$ is satisfied, and $\varepsilon_{TS}$: a maximum error between a communication period calculated using a time stamp of the basic processor 220 and a communication period of an auxiliary network.

In the basic processor 220, the time stamp count $n_{TS,MM}$ may be increased every predetermined period $T_{TS,MM}$.

In addition, based on a comparison result between result data (see (8-2) of FIG. 2) read from the shared memory 240 or transmitted from the basic processor 220 via the local network and command data (see (10-1) of FIG. 2) transmitted from the auxiliary network master controller 120 or the wireless network master controller 130 to the auxiliary network slave controller 260 or the wireless network module 270 via the auxiliary network or the wireless network in a state in which abnormality does not occur in the auxiliary network or the wireless network and in the auxiliary processor 230 based on the diagnosis result, when it is determined that the result data and the command data do not correspond to each other, the master module 100 may determine that abnormality occurs in the basic processor 220.

For example, in a state in which abnormality does not occur in the auxiliary network or the wireless network and in the auxiliary processor 230, when the result data read from the shared memory 240 or transmitted from the basic processor 220 via the local network is result data obtained by rotating the motor by 5 degrees and the command data transmitted from the auxiliary network master controller 120 or the wireless network master controller 130 to the auxiliary network slave controller 260 or the wireless network module 270 via the auxiliary network or the wireless network is command data for rotating the motor by 10 degrees, the result data and the command data do not correspond to each other, and therefore it may be determined that abnormality occurs in the basic processor 220.

When abnormality occurs in the basic processor 220, the master module 100 may receive status information of the motor corresponding to the corresponding slave module acquired through the sensor 410 or 420 from the auxiliary processor 230 via the auxiliary network or the wireless network, generate command data for controlling a different slave module in consideration of the received status information, and transmit the generated command data to the different slave module. Specifically, when abnormality occurs in the basic processor 220, the auxiliary network slave controller 260 or the wireless network module 270 may receive the status information of the motor corresponding to the corresponding slave module acquired through the sensor 410 or 420 from the auxiliary processor 230 (see (7-2)→(9-2), (7-3)→(9-2), (7-2)→(11-2), or (7-3)→(11-2) of FIG. 2), and transmit the status information of the motor to the auxiliary network master controller 120 or the wireless network master controller 130 via the auxiliary network or the wireless network (see (10-2) of FIG. 2)). The master module 100 may generate command data for controlling a different slave module in consideration of the received status information of the motor and transmit the generated command data to the different slave module.

For example, it may be assumed that a motor corresponding to each of the one or more slave modules 200-1, 200-2, . . . , and 200-N operates each of one or more joints included in a predetermined robot arm. Here, it may be assumed that a wrong control command is transmitted to the motor due to the occurrence of abnormality in the basic processor 220 of a specific slave module being responsible for the movement of the shoulder joint so that the robot arm hits a ceiling upward. The master module 100 may receive status information (information corresponding to a status in which the robot arm strikes the ceiling) of the motor corresponding to the specific slave module acquired through the sensor from the auxiliary network slave controller 260 or the wireless network module 270 via the auxiliary network or the wireless network, generate command data for a different slave module for adjusting the elbow joint of the robot arm in consideration of the received status information of the motor, and transmit the generated command data to the different slave module. Accordingly, the robot arm may be folded and thereby may avoid the situation in which the robot arm hits the ceiling. However, even in the above-described case, the operation of the corresponding slave module may be stopped and replacement of the defective device may be made.

Meanwhile, the master module 100 may acquire status information of the motor corresponding to the corresponding slave module from each of the basic sensor 410 and the auxiliary sensor 420 in a predetermined time interval. Next, when a difference value between the status information acquired from the basic sensor 410 and the status information acquired from the auxiliary sensor 420 is a predetermined value or larger based on the comparison result therebetween, it may be determined that abnormality occurs in the basic sensor. In other words, when the following Equation 4 is satisfied, it may be determined that abnormality occurs in the basic sensor 410.

$$|S_{MS}-S_{AS}|>\varepsilon_{sensor} \quad \text{Equation 4:}$$

Here, $S_{MS}$: a sensor value of the basic sensor 410, $S_{AS}$: a sensor value of the auxiliary sensor 420, and $\varepsilon_{sensor}$: a maximum error between the basic sensor 410 and the auxiliary sensor 420.

In this case, the basic sensor 410 may be implemented as an incremental encoder, and the auxiliary sensor 420 may be implemented as an absolute encoder to thereby diagnose failure of the incremental encoder. At this time, when a difference between a position value $\theta_{ie}(k)$ by the incremental encoder and a position value $\theta_{ae}(k)$ by the absolute encoder is $\varepsilon_{encoder}$ or larger, it may be determined that the encoder is failed. That is, when the following Equation 5 is satisfied, it may be determined that the encoder is failed.

$$|\theta_{ie}(k)-\theta_{ae}(k)|>\varepsilon_{encoder} \quad \text{Equation 5:}$$

In addition, the basic sensor 410 may be implemented as a limit sensor, and the auxiliary sensor 420 may be implemented as an absolute encoder to thereby diagnose failure of the limit sensor. A region in which the limit sensor is detected may be set in advance as a value of the absolute encoder. Whether the limit sensor is detected compared to the absolute encoder value may be periodically determined during the driving of the motor. When the limit sensor is detected outside a range of the absolute encoder value which is initially set or when the limit sensor is not detected within the range, it may be determined that the encoder is failed.

The basic processor 220 may acquire status information (for example, a current rotation angle of the motor) of the motor through the basic sensor 410 in real time (see (7-1) of FIG. 2). Here, when abnormality occurs in the basic sensor 410, the basic processor 220 may control the corresponding slave module or support to control the corresponding slave module in consideration of the status information (see (3-1)→(4-1) of FIG. 2) of the motor corresponding to the corresponding slave module which has been detected through the auxiliary sensor 420 to be provided to the auxiliary processor 230 (see (7-3) of FIG. 2) and stored in the shared memory 240 by the auxiliary processor 230 or transmitted to the basic processor 220 from the auxiliary processor 230 via the local network.

In addition, as illustrated in FIG. 2, the auxiliary processor 230 and the auxiliary sensor 420 may be electrically isolated from other components of the corresponding slave module. Accordingly, it is possible to increase the system stability in a hardware manner (10 of FIG. 2).

Meanwhile, the reliability of the auxiliary sensor 420 should be ensured because it should provide sensing information when abnormality occurs in the basic sensor 410, and therefore the auxiliary sensor 420 may be checked through the access to a status register of the auxiliary sensor 420 via an SPI (serial peripheral interface) separately from the diagnosis for the basic sensor 410, the installation status of the auxiliary sensor 420 may be determined by checking a magnetic installation status, and the status of the auxiliary sensor 420 may be checked by checking a normal operation through a PWM (pulse-width modulation) waveform of the auxiliary sensor 420.

Meanwhile, although abnormality does not occur in the auxiliary network or the wireless network and even in the auxiliary processor 230, the basic processor 220, and the sensor for detecting status information of the motor corresponding to the corresponding slave module, when it is determined that a difference between a predicted status value and a current status value of the motor corresponding to the corresponding slave module exceeds a predetermined range based on a comparison result between the predicted status value of the motor corresponding to the corresponding slave module transmitted from the auxiliary network master controller 120 or the wireless network master controller 130 to the auxiliary network slave controller 260 or the wireless network module 270 via the network determined that abnormality does not occur and the current status value of the motor corresponding to the corresponding slave module detected through the basic sensor 410 or the auxiliary sensor 420, the master module 100 may determine that abnormality occurs in the motor corresponding to the corresponding slave module or the motor driver for driving the motor. In other words, when the following Equation 6 is satisfied, it may be determined that abnormality occurs in the motor corresponding to the corresponding slave module or the motor driver for driving the motor.

$$(\Sigma|d_{estimate}S_{MS}|)>\varepsilon_{estimate} \quad \text{Equation 6:}$$

Here, $d_{estimate}$: a predicted status value of the motor over time calculated based on a target value, and $\varepsilon_{estimate}$: a cumulative maximum error between the predicted status value and the current status value of the motor.

In this manner, when it is determined that abnormality occurs in the motor corresponding to the corresponding slave module or the motor driver for driving the motor, the master module 100 may acquire current status information of the motor corresponding to the corresponding slave module from the auxiliary processor 230 via the network determined that abnormality does not occur, generate command data for controlling a different slave module in consideration of the acquired status information, and transmit the generated command data to the different slave module. Specifically, when it is determined that abnormality occurs in the motor corresponding to the corresponding slave module or the motor driver for driving the motor, the auxiliary network master controller 120 or the wireless network master controller 130 may receive current status information of the motor corresponding to the corresponding slave module, which has been acquired in the auxiliary processor 230, from the auxiliary network slave controller 260 or the wireless network module 270 via the auxiliary network or the wireless network (see (7-2)→(9-2)→(10-2), (7-3)→(9-2)→(10-2), (7-2)→(11-2) or (7-3)→(11-2) of FIG. 2), and the master module 100 may generate command data for controlling a different slave module in consideration of the received status information and transmit the generated command data to the different slave module.

In addition, according to the diagnosis method 1-2, although abnormality does not occur in the auxiliary network or the wireless network and even in the auxiliary processor 230, the basic processor 220, the motor corresponding to the corresponding slave module, the motor driver 250 for driving the motor, and the sensor 410 or 420 for detecting status information of the motor, when result data A and result data B do not correspond to each other based on a comparison result between the result data A which has been executed according to the command data by the basic processor 220 to be provided to the basic network master controller 110, has been supported to be executed according to the command data by the basic processor 220 to be stored in the shared memory 240 and transmitted to the auxiliary processor 230, or has been transmitted to the auxiliary processor 230 via the local network to be transmitted to the basic network master controller 110 via the basic network, and the result data B which has been supported to be executed according to the command data by the basic processor 220 to be stored in the shared memory 240 and transmitted to the auxiliary processor 230 or has been transmitted to the auxiliary processor 230 via the local network and provided to the auxiliary network master controller 120 or the wireless network master controller 130 via the network determined that abnormality does not occur, the master module 100 may determine that abnormality occurs in the basic network or the basic network slave controller 210. That is, in FIG. 2, even in a case in which abnormality does not occur in the auxiliary network or the wireless network and even in the auxiliary processor 230, the basic processor 220, the motor corresponding to the corresponding slave module, the motor driver 250 for driving the motor, and the basic sensor 410 for detecting the status information of the motor, when (1-2) and (10-2) are different from each other, the master module 100 may determine that abnormality occurs in the basic network or the basic network slave controller 210.

When it is determined that abnormality occurs in the basic network or the basic network slave controller 210, the basic network master controller 110 may stop the transmission of the command data via the basic network as described above. Next, the auxiliary network master controller 120 or the wireless network master controller 130 may receive result data read from the shared memory 240 or transmitted from the basic processor 220 via the local network, from the auxiliary network slave controller 260 or the wireless network module 270 via the network determined that abnormality does not occur (see (8-2)→(9-2)→(10-2) or (8-2)→(11-2) of FIG. 2). Next, the auxiliary network master controller 120 or the wireless network master controller 130 may transmit command data for continuing to control the motor corresponding to the corresponding slave module, which has been generated based on the result data, to the auxiliary network slave controller 260 or the wireless network module 270 (see (10-1) of FIG. 2), and thereby may support the basic processor 220 to continue to control the motor corresponding to the corresponding slave module or support the basic processor 220 to control the motor (see (9-1)→(3-1)→(4-1)→(5)→(6) or (11-1)→(3-1)→(4-1)→(5)→(6) of FIG. 2).

Meanwhile, diagnosis for the occurrence and nonoccurrence of abnormality in the auxiliary network, the wireless network, and the basic processor 220 may be performed in a relatively low frequency compared to diagnosis for the occurrence and nonoccurrence of abnormality in the basic sensor 410, the motor driver 250, the motors 300-1, 300-2, . . . , and 300-N, and the basic network in the above-described diagnosis method 1-2. For example, the former diagnosis may be performed every $T_{diga}$, and the latter diagnosis may be performed every $20*T_{diag}$.

Meanwhile, there may be other diagnosis methods, and this will be described briefly in the following.

Among the other diagnosis methods, there is technology for diagnosing failure of the internal components of the slave module or the motor using a variety of sensors. In this case, diagnosis for the failure may be performed by the above-described master module 100. Alternatively, the diagnosis for the failure may be performed by the basic processor 220 or the auxiliary processor 230, the master module 100 may be notified of the diagnosis result, and the diagnosis result may be transmitted to a user. Here, a case in which the diagnosis for the failure may be performed by the basic processor 220 or the auxiliary processor 230 will be mainly described.

First, the basic processor 220 or the auxiliary processor 230 may monitor the output of an analog circuit of each of the one or more slave modules 200-1, 200-2, . . . , and 200-N and determine a flag which is set (or reset) when a current flowing in the motor is a maximum value or larger. When the flag is set, it may be diagnosed as overcurrent failure.

In addition, the basic processor 220 or the auxiliary processor 230 may detect a case in which the motor corresponding to the corresponding slave module is run away independently of the command data or the motor is not smoothly driven due to external causes. When a tracking error between a command data value $\alpha_{cmd}$ and a current value $\alpha_f$ is a limit $\varepsilon_\alpha$ or larger, it may be determined that the motor is run away or the driving of the motor is failed. That is, when the following Equation 7 is satisfied, it may be determined that the motor is run away or the driving of the motor is failed.

$$|\alpha_{cmd}-\alpha_f|>\varepsilon_\alpha \qquad \text{Equation 7:}$$

In addition, the basic processor 220 or the auxiliary processor 230 may mount a temperature sensor or a temperature detection device in the motor driver 250 that generates heat and thereby periodically monitor the output value of the temperature sensor or temperature detection device. For example, when the temperature is 100 degrees Celsius or higher, it may be diagnosed as failure.

Hereinafter, a motor control system according to another embodiment of the present invention will be described. However, the above-described contents may be equally applicable to other embodiments which will be described in the following as long as they are not inconsistent.

Figure 4:
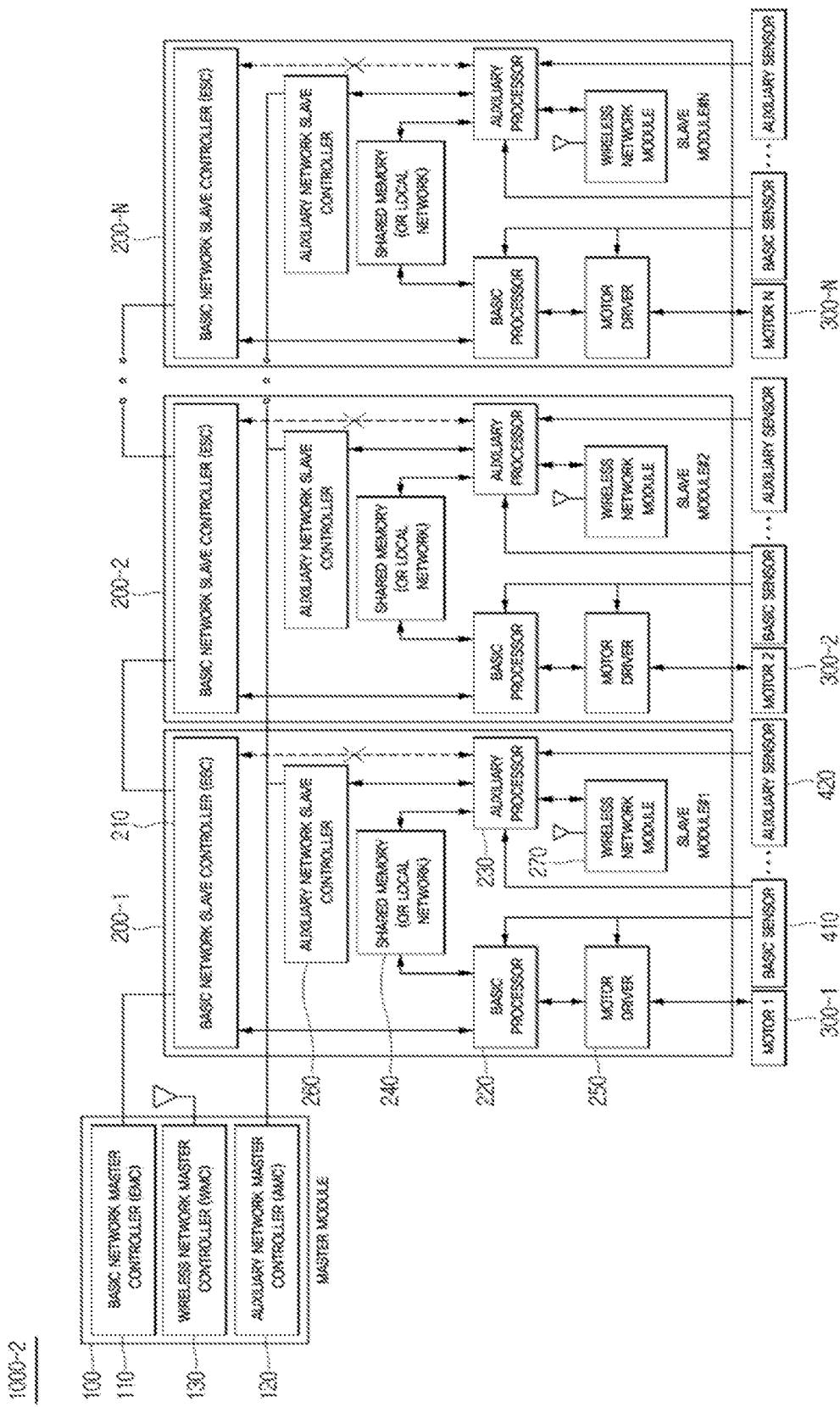
FIG. 4 is a block diagram illustrating constituent components of a motor control system according to another embodiment of the present invention.

FIG. 4 is a block diagram illustrating components of a motor control system according to another embodiment of the present invention.

As illustrated in FIG. 4, in a motor control system 1000-2 according to another embodiment of the present invention, communication between the basic network slave controller 210 and the auxiliary processor 230 may not be performed unlike the above-described motor control system 1000-1. That is, the basic network slave controller 210 may receive command data from the basic network master controller 110 via the basic network, and transmit the received command data only to the basic processor 220. In this case, the basic processor 220 may control a motor corresponding to the corresponding slave module or support the motor driver 250 to control the motor. Next, the basic processor 220 may support result data executed according to the command data to be stored in the shared memory 240 and transmitted to the auxiliary processor 230, or transmit the result data to the auxiliary processor 230 via the local network.

Figure 5:
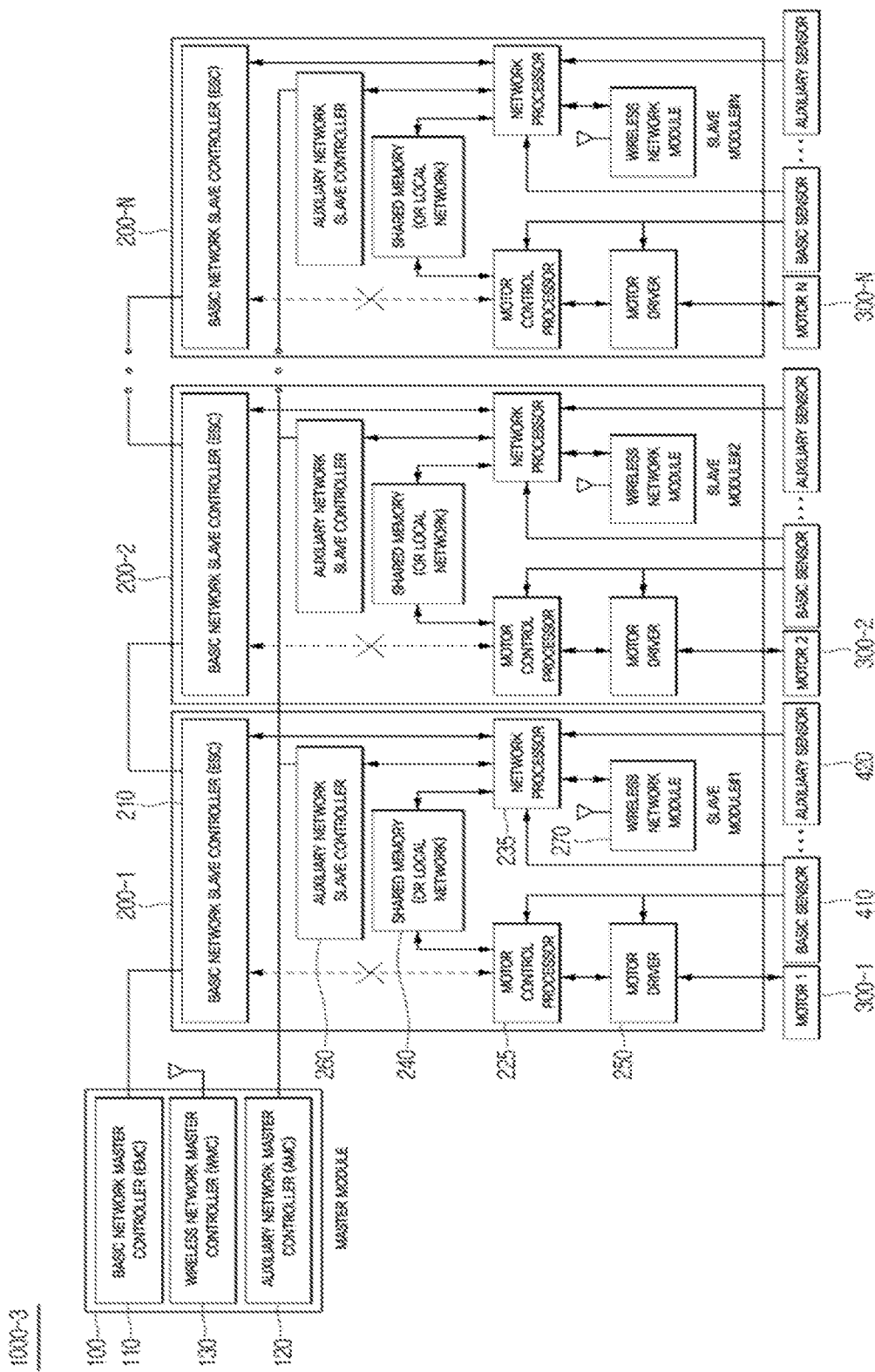
FIG. 5 is a block diagram illustrating constituent components of a motor control system according to still another embodiment of the present invention.

FIG. 5 is a block diagram illustrating components of a motor control system according to still another embodiment of the present invention. The above-description of the motor control system 1000-1 other than contents specifically mentioned in the following description may be equally applicable.

Referring to FIG. 5, a motor control system 1000-3 according to still another embodiment of the present invention includes a master module 100 and one or more slave modules 200-1, 200-2, ..., and 200-N.

The master module 100 is a component that controls each of one or more motors 300-1, 300-2, ..., and 300-N through each of the one or more slave modules 200-1, 200-2, ..., and 200-N connected via a network. Specifically, the master module 100 may generate command data for controlling each of the one or more motors 300-1, 300-2, ..., and 300-N connected to the one or more slave modules 200-1, 200-2, ..., and 200-N, and transmit the generated command data to each of the one or more slave modules 200-1, 200-2, ..., and 200-N via the network. In addition, the master module 100 may determine whether abnormality occurs in a basic network or internal components included in each of the one or more slave modules 200-1, 200-2, ..., and 200-N as will be described later, and control the corresponding motor via an auxiliary network or a wireless network based on the determination result or control a different slave module in consideration of status information of the corresponding motor. As illustrated in FIG. 5, the master module 100 may include a basic network master controller 110, an auxiliary network master controller 120, and a wireless network master controller 130. Hereinafter, an embodiment in which the master module 100 includes both the auxiliary network master controller 120 and the wireless network master controller 130 will be described, but the master module 100 may include either the auxiliary network master controller 120 or the wireless network master controller 130. When the master module 100 includes either the auxiliary network master controller 120 or the wireless network master controller 130, each of the one or more slave modules 200-1, 200-2, ..., and 200-N which will be described later may include either an auxiliary network slave controller 260 or a wireless network module 270.

The basic network master controller 110 transmits the command data to each of the one or more slave modules 200-1, 200-2, ..., and 200-N via the basic network. Here, the basic network is a high-speed network that connects the master module 100 and each of the one or more slave modules 200-1, 200-2, ..., and 200-N. As an example, the basic network may be a high-speed fieldbus-based EtherCAT network. The EtherCAT network may provide a high communication speed of 100 Mbps or higher. When the basic network is the EtherCAT network, the basic network master controller 110 may be an EMC (EtherCAT master controller).

The auxiliary network master controller 120 transmits the command data to each of the one or more slave modules 200-1, 200-2, ..., and 200-N via the auxiliary network. Here, the auxiliary network may connect the master module 100 and each of the one or more slave modules 200-1, 200-2, ..., and 200-N, and transmit the command data. The auxiliary network may be a low-speed fieldbus-based network. For example, the auxiliary network may be a network utilizing a low-speed fieldbus such as a CAN or an RS-485 network.

The wireless network master controller 130 transmits the command data to each of the one or more slave modules 200-1, 200-2, ..., and 200-N via the wireless network. Here, the wireless network may connect the master module 100 and each of the one or more slave modules 200-1, 200-2, ..., and 200-N in a wireless manner, and transmit the command data. The wireless network may be implemented by technologies such as Wi-Fi, WCDMA, mobile WiMAX, WiBro, LTE, Bluetooth LE, Zigbee, and the like.

In addition, as illustrated in FIG. 5, each of the one or more slave modules 200-1, 200-2, ..., and 200-N may include a basic network slave controller 210, a motor control processor 225, a network processor 235, a shared memory 240, a motor driver 250, the auxiliary network slave controller 260, and the wireless network module 270.

The motor control processor 225 is a component that controls a motor corresponding to the corresponding slave module using the command data acquired via the network, or supports the control of the motor. Specifically, the motor control processor 225 may control the motor corresponding to the corresponding slave module according to the command data read from the shared memory 240 or transmitted via a local network, or support the motor driver 250 to control the motor. Next, the motor control processor 225 may support result data executed according to the command data to be stored in the shared memory 240 and transmitted to the network processor 235, or transmit the result data to the network processor 235 via the local network.

The basic network slave controller 210 is a component that receives the command data from the basic network master controller 110 via the basic network and transmits the received command data to the network processor 235. Specifically, when abnormality does not occur in the basic network, the basic network slave controller 210 may receive the command data from the basic network master controller 110 via the basic network and support the network processor 235 to store the command data in the shared memory 240 and transmit the stored command data to the motor control processor 225, or support the network processor 235 to transmit the command data to the motor control processor 225 via the local network. Next, the basic network slave controller 210 may transmit result data acquired from the motor control processor 225 to the basic network master controller 110. In addition, the basic network slave controller 210 may acquire information for determining whether abnormality occurs in the basic network. This will be described later. When the basic network is an EtherCAT network, the basic network slave controller 210 may be an ESC.

Meanwhile, as illustrated in FIG. 5, the basic network slave controller 210 may not perform communication directly with the motor control processor 225 unlike the above-described embodiment. That is, the basic network slave controller 210 may perform communication only with the network processor 235 and thereby perform the above-described operation.

The network processor 235 is a component that acquires the command data via the auxiliary network or the wireless network when abnormality occurs in the basic network and supports the motor control processor 225 to continue to control the motor corresponding to the corresponding slave module. The network processor 235 may acquire the command data from the master module 100 via the basic network and support the acquired command data to be stored in the shared memory 240 and transmitted to the motor control processor 225, or transmit the command data to the motor control processor 225 via the local network.

In addition, when abnormality occurs in the basic network, the network processor 235 may provide result data read from the shared memory 240 or received via the local network to the master module 100 via the auxiliary network or the wireless network, or acquire command data for continuing to control the motor corresponding to the corresponding slave module via the auxiliary network or the wireless network from the master module 100 and support the acquired command data to be stored in the shared memory 240 and transmitted to the motor control processor 225 or transmit the command data to the motor control processor 225 via the local network and support the motor control processor 225 to control the motor corresponding to the corresponding slave module. That is, when abnormality occurs in the basic network, the network processor 235 may read result data indicating results obtained by controlling the motor corresponding to the corresponding slave module which have been stored in the shared memory 240 by the motor control processor 225 or receive the result data from the motor control processor 225 via the local network, and transmit the read or received result data to the master module 100 via the auxiliary network or the wireless network. The master module 100 may determine a current status of the motor corresponding to the corresponding slave module through the result data. The network processor 235 may acquire the command data for continuing to control the motor corresponding to the corresponding slave module from the master module 100 via the auxiliary network or the wireless network and support the acquired command data to be stored in the shared memory 240 and transmitted to the motor control processor 225, or transmit the command data to the motor control processor 225 via the local network, thereby supporting the motor control processor 225 to continue to control the motor corresponding to the corresponding slave module.

In addition, the network processor 235 may acquire status information of the motor corresponding to the corresponding slave module from a basic sensor 410 or an auxiliary sensor 420 in a predetermined time interval. When each of the one or more slave modules 200-1, 200-2, . . . , and 200-N is configured as a multi-core processor, the network processor 235 may be a single core constituting a multi-core. When using the multi-core processor in this manner, a function for controlling a motor and a function for controlling a network may be independently implemented in each core, which leads to a reduction in mutual operational interference, thereby improving driving performance and stability of the whole system. The network processor 235 may be implemented by a DSP.

The shared memory 240 is a space that stores data which each of the motor control processor 225 and the network processor 235 may commonly access and read. In the shared memory 240, the command data received by the motor control processor 225 or the network processor 235 from the master module 100, the result data executed according to the command data, and the like may be stored. The result data may include result information obtained by processing the command data by the motor control processor 225 or status information of the motor corresponding to the corresponding slave module acquired through the basic sensor 410 or the auxiliary sensor 420. For example, the shared memory 240 may store current position data of the motor acquired through the basic sensor 410 as the result data. In addition, the shared memory 240 may store an interrupt flag, a global time, and the like.

Meanwhile, instead of sharing data through the shared memory 240 as described above, data may be transmitted and received between the motor control processor 225 and the network processor 235 via the local network. The local network may be connected by an I²C (inter-integrated circuit) bus or an SPI (serial peripheral interface) bus.

In addition, when each of the one or more slave modules 200-1, 200-2, . . . , and 200-N has a memory corresponding to the motor control processor 225 and a memory corresponding to the network processor 235, the motor control processor 225 and the network processor 235 may transmit the above-described command data or result data via the local network, and store the transmitted command data or result data in the memory corresponding to the opposite processor. Here, the "memory corresponding to the processor" does not mean a memory necessarily included in the processor, and may be a concept including a memory that is organically related and operable and also including a memory stored for a short time such as a cache memory.

As described above, the motor control processor 225 and the network processor 235 share data through the shared memory or transmit and receive data via the local network, but this is merely an example, and the motor control processor 225 and the network processor 235 may share data through a variety of technical means.

The motor driver 250 may receive control data from the motor control processor 225, control a torque, a speed, a position, and the like of the motor corresponding to the corresponding slave module, and drive the motor.

The auxiliary network slave controller 260 is a component that receives the command data from the auxiliary network master controller 120 via the auxiliary network or transmits the result data to the auxiliary network master controller 120. As an example, when abnormality occurs in the basic network, the auxiliary network slave controller 260 may receive the command data from the auxiliary network master controller 120 via the auxiliary network and support the network processor 235 to store the command data in the shared memory 240 and transmit the stored command data to the motor control processor 225, or support the network processor 235 to transmit the command data to the motor control processor 225 via the local network. In addition, the auxiliary network slave controller 260 may transmit the result data read from the shared memory 240 or acquired from the motor control processor 225 via the local network to the auxiliary network master controller 120 via the auxiliary network. In addition, even when the basic network is operated normally, the auxiliary network slave controller 260 may transmit the result data or sensor data acquired from the sensors 410 and 420 to the auxiliary network master controller 120, and support the auxiliary network master controller 120 to monitor an operating status of the motor. Even in this case, the auxiliary network slave controller 260 may support the network processor 235 to store the command data in the shared memory 240 and transmit the stored command data to the motor control processor 225, as necessary, or support the network processor 235 to transmit the command data to the motor control processor 225 via the local network. In addition, as will be described later, the auxiliary network slave controller 260 may acquire information for determining whether abnormality occurs in the auxiliary network.

The wireless network module 270 is a component that receives the command data from the wireless network master controller 130 via the wireless network or transmit the result data to the wireless network master controller 130. As an example, when abnormality occurs in the basic network, the wireless network module 270 may receive the command data from the wireless network master controller 130 via the wireless network and support the network processor 235 to store the received command data in the shared memory 240 and transmit the stored command data to the motor control processor 225, or support the network processor 235 to transmit the command data to the motor control processor 225 via the local network. In addition, the wireless network module 270 may transmit the result data read from the shared memory 240 or acquired from the motor control processor 225 via the local network to the wireless network master controller 130 via the wireless network. In addition, even when the basic network is operated normally, the wireless network module 270 may transmit the result data or the sensor data acquired from the sensors 410 and 420 to the wireless network master controller 130 and support the wireless network master controller 130 to monitor an operating status of the motor. Even in this case, the wireless network module 270 may support the network processor 235 to store the command data in the shared memory 240 and transmit the stored command data to the motor control processor 225, as necessary, or support the network processor 235 to transmit the command data to the motor control processor 225 via the local network.

Meanwhile, each of the above-described basic network slave controller 210, auxiliary network slave controller 260, wireless network module 270, shared memory 240, motor control processor 225, network processor 235, motor driver 250, and the like may be configured as a single SOC, or may be respectively implemented as a separate chip.

As to an abnormality diagnosis method and responding method of the motor control system 1000-3 according to an embodiment of the present invention, similar technology to that of the above-described motor control system 1000-1 may be used. In this case, the above-description of the basic processor 220 and the auxiliary processor 230 may be applicable to the motor control processor 225 and the network processor 235, respectively, as long as it is not inconsistent with the above-described contents.

The motor control system 1000-3 according to an embodiment of the present invention may diagnose whether abnormality occurs in a network, internal components of a slave module, a motor, a sensor, and the like independently using a diagnosis method 2-1 and/or a diagnosis method 2-2.

First, the diagnosis method 2-1 will be described.

The diagnosis method 2-1 is a method of determining whether abnormality occurs in the basic network according to a self-diagnosis method of the motor control system 1000-3. Specifically, the basic network slave controller 210 may periodically check a data transmission/reception status or the like, and set a flag indicating occurrence and nonoccurrence of abnormality in the basic network. When the master module 100 acquires flag information indicating the occurrence of abnormality in the basic network from the basic network slave controller 210, it may be determined that abnormality occurs in the basic network connected to the corresponding slave module. As an example, when the basic network slave controller 210 is implemented by an ESC, occurrence and nonoccurrence of abnormality in the basic network may be determined using a self-diagnosis function of the ESC. Here, the flag information may be at least one of physical link status check information, lost link counter check information, stable communication status check information, frame corruption diagnostics information, command processing diagnostics information, state machine diagnostics information, and DC synchronization diagnostics information.

In addition, when initialization of the basic network is not performed within a predetermined time or the basic network master controller 110 does not receive predetermined data in a predetermined time interval from the basic network slave controller 210 even though the flag information indicating the occurrence of abnormality in the basic network is not acquired from the basic network slave controller 210, the master module 100 may determine that abnormality occurs in the basic network connected to the corresponding slave module. However, even when the basic network slave controller 210 is failed, the initialization of the basic network may not be performed or data reception from the basic network slave controller 210 may not be performed, and therefore in this case, it may be determined that the basic network slave controller 210 is failed. In addition, when data received from the same slave module is the same as a specific value for a predetermined time period or more or when data received from mutually different slave modules is the same as a specific value for a predetermined time period or more, it may be determined that data is not properly received from the network processor 235 or the received data is not properly transmitted, and therefore this may be determined that the basic network slave controller 210 is failed.

When abnormality occurs in the basic network, the master module 100 may determine whether abnormality occurs in the auxiliary network connecting the corresponding slave module and the auxiliary network master controller 120 and the wireless network connecting the corresponding slave module and the wireless network master controller 130, without continuing to control the motor corresponding to the corresponding slave module via the auxiliary network or the wireless network. At this time, when abnormality does not occur in the auxiliary network or the wireless network, the command data may be transmitted in the same method as the above-described method via the network determined that abnormality does not occur, and when abnormality occurs in the auxiliary network and the wireless network, a user may be notified of the occurrence of abnormality in the network. This is because repair is required due to the occurrence of abnormality in all of the basic network, the auxiliary network, and the wireless network. A method of determining whether abnormality occurs in the auxiliary network will be described later.

Hereinafter, the diagnosis method 2-2 for the motor control system 1000-3 according to an embodiment of the present invention will be described.

The diagnosis method 2-2 for the motor control system 1000-3 according to an embodiment of the present invention is a method of diagnosing the basic network or the like via the auxiliary network or the wireless network. Here, the reliability of the auxiliary network, the wireless network, and the network processor 235 should be verified preferentially, and therefore whether abnormality occurs in the auxiliary network, the wireless network, and the network processor 235 may be diagnosed. That is, the master module 100 may diagnose whether abnormality occurs in the auxiliary network, the wireless network, or the network processor 235, and when it is determined that abnormality does not occur in the auxiliary network or the wireless network and in the network processor 235 based on the diagnosis result, the master module 100 may determine whether abnormality occurs in the basic network via the network determined that abnormality does not occur.

The master module 100 may determine whether abnormality occurs in the auxiliary network through similar technology to the above-described diagnosis method 2-1. That is, the master module 100 may determine whether abnormality occurs in the auxiliary network according to a self-diagnosis method of the motor control system 1000-3. Specifically, when acquiring flag information indicating the occurrence of abnormality in the auxiliary network from the auxiliary network slave controller 260, the master module 100 may determine that abnormality occurs in the auxiliary network connected to the corresponding slave module. Here, the flag information may be at least one of parity bit information, CRC information, and acknowledge error information.

In addition, the master module 100 may periodically transmit command data for requesting a reply of ID from a specific slave module to the auxiliary network slave controller 260 via the auxiliary network, and determine that abnormality occurs in the auxiliary network when the ID is not received from the specific slave module within a predetermined time.

At this time, the master module 100 may determine that abnormality occurs in the auxiliary network or the network processor 235 when the following Equation 8 is satisfied. Here, $t_f$ denotes a time during which result data is transmitted from the auxiliary network slave controller 260 to the auxiliary network master controller 120 via the auxiliary network, $t_i$ denotes a time during which command data is transmitted from the auxiliary network master controller 120 to the auxiliary network slave controller 260 via the auxiliary network, and $T_{diag}$ denotes a failure diagnosis period.

$$((t_f - t_i) > T_{diag}) \&\& (|t_f - t_{f-1}| - T_{diag} | \varepsilon_{An}) \quad \text{Equation 8:}$$

In addition, when the following Equation 9 is satisfied, it may be determined that abnormality occurs in the network processor 235.

$$|\Delta n_{TS,AM} * T_{TS,AM} - T_{diag}| > \varepsilon_{TS} \quad \text{Equation 9:}$$

Here, $$n_{TS,AM} = n_{TS,AM,f} - n_{TS,AM,f-1},$$

$n_{TS,AM,f}$: a time stamp count value of the network processor 235 transmitted to the master module 100 when t=f is satisfied, $\varepsilon_{TS}$: a maximum error between a communication period calculated using a time stamp of the network processor 235 and a communication period an auxiliary network, and $\varepsilon_{AN}$: a maximum error range between a transmission period and a reception period of the auxiliary network.

In the network processor 235, the time stamp count $n_{TS,AM}$ may be increased every predetermined period $T_{TS,AM}$.

When abnormality occurs in the auxiliary network or the network processor 235 based on the diagnosis result, the master module 100 may output a message for notifying the occurrence of abnormality in the auxiliary network or the network processor 235. In addition, when abnormality occurs even in the basic network as described above, the master module 100 may stop the operation of the corresponding slave module. In this case, replacement of the defective device may be made.

Meanwhile, according to the diagnosis method 2-2, the occurrence and nonoccurrence of abnormality in the basic network may be determined in consideration of a comparison result between result data provided to the basic network master controller 110 via the basic network and result data provided from the auxiliary network master controller 120 or the wireless network master controller 130 via the auxiliary network or the wireless network, as will be described below, and therefore the occurrence and nonoccurrence of abnormality in the basic network may not be accurately determined when abnormality occurs in the motor control processor 225. For reference, when abnormality does not occur in the auxiliary network or the wireless network and in the network processor 235 based on the diagnosis result of the diagnosis method 2-2, the master module 100 may determine whether abnormality occurs in the motor control processor 225 via the network determined that abnormality does not occur.

The occurrence and nonoccurrence of abnormality in the motor control processor 225 may be determined based on whether the following Equation 10 is satisfied.

That is, when the following Equation 10 is satisfied, it may be determined that abnormality occurs in the motor control processor 225.

$$|\Delta n_{TS,MM} * T_{TS,MM} - T_{diag}| > \varepsilon_{TS} \quad \text{Equation 10:}$$

Here, $T_{diag}$: failure diagnosis period, $$n_{TS,MM} = n_{TS,MM,f} - n_{TS,MM,f-1},$$

$n_{TS,MM,f}$: a time stamp count value of the motor control processor 225 transmitted to the master module 100 when t=$t_f$ is satisfied, and $\varepsilon_{TS}$: a maximum error between a communication period calculated using a time stamp of the motor control processor 225 and a communication period of an auxiliary network.

In the motor control processor 225, the time stamp count $n_{TS,MM}$ may be increased every predetermined period $T_{TS,MM}$.

In addition, based on a comparison result between result data read from the shared memory 240 or transmitted from the motor control processor 225 via the local network and command data transmitted from the auxiliary network master controller 120 or the wireless network master controller 130 to the auxiliary network slave controller 260 or the wireless network module 270 via the auxiliary network or the wireless network in a state in which abnormality does not occur in the auxiliary network or the wireless network and in the network processor 235 based on the diagnosis result, when it is determined that the result data and the command data do not correspond to each other, the master module 100 may determine that abnormality occurs in the motor control processor 225.

For example, in a state in which abnormality does not occur in the auxiliary network or the wireless network and in the network processor 235, when the result data read from the shared memory 240 or transmitted from the motor control processor 225 via the local network is result data obtained by rotating the motor by 5 degrees and the command data transmitted from the auxiliary network master controller 120 or the wireless network master controller 130 to the auxiliary network slave controller 260 or the wireless network module 270 via the auxiliary network or the wireless network is command data for rotating the motor by 10 degrees, the result data and the command data do not correspond to each other, and therefore it may be determined that abnormality occurs in the motor control processor 225.

When abnormality occurs in the motor control processor 225, the master module 100 may receive status information of the motor corresponding to the corresponding slave module acquired through the sensor 410 or 420 from the network processor 235 via the auxiliary network or the wireless network, generate command data for controlling a different slave module in consideration of the received status information, and transmit the generated command data to the different slave module. Specifically, when abnormality occurs in the motor control processor 225, the auxiliary network slave controller 260 or the wireless network module 270 may receive the status information of the motor corresponding to the corresponding slave module acquired through the sensor 410 or 420 from the network processor 235, and transmit the status information of the motor to the auxiliary network master controller 120 or the wireless network master controller 130 via the auxiliary network or the wireless network. The master module 100 may generate command data for controlling a different slave module in consideration of the received status information of the motor and transmit the generated command data to the different slave module.

For example, it may be assumed that a motor corresponding to each of the one or more slave modules 200-1, 200-2, . . . , and 200-N operates each of one or more joints included in a predetermined robot arm. Here, it may be assumed that a wrong control command is transmitted to the motor due to the occurrence of abnormality in the motor control processor 225 of a specific slave module being responsible for the movement of the shoulder joint so that the robot arm hits a ceiling upward. The master module 100 may receive status information (information corresponding to a status in which the robot arm strikes the ceiling) of the motor corresponding to the specific slave module acquired through the sensor from the auxiliary network slave controller 260 or the wireless network module 270 via the auxiliary network or the wireless network, generate command data for a different slave module for adjusting the elbow joint of the robot arm in consideration of the received status information of the motor, and transmit the generated command data to the different slave module. Accordingly, the robot arm may be folded and thereby may avoid the situation in which the robot arm hits the ceiling. However, even in the above-described case, the operation of the corresponding slave module may be stopped and replacement of the defective device may be made.

Meanwhile, the master module 100 may acquire status information of the motor corresponding to the corresponding slave module from each of the basic sensor 410 and the auxiliary sensor 420 in a predetermined time interval. Next, when a difference value between the status information acquired from the basic sensor 410 and the status information acquired from the auxiliary sensor 420 is a predetermined value or larger based on the comparison result therebetween, it may be determined that abnormality occurs in the basic sensor. In other words, when the following Equation 11 is satisfied, it may be determined that abnormality occurs in the basic sensor 410.

$$|S_{MS}-S_{AS}|>\varepsilon_{sensor}$$ Equation 11:

Here, $S_{MS}$: a sensor value of the basic sensor 410,
$S_{AS}$: a sensor value of the auxiliary sensor 420, and
$\varepsilon_{sensor}$: a maximum error between the basic sensor 410 and the auxiliary sensor 420.

In this case, the basic sensor 410 may be implemented as an incremental encoder, and the auxiliary sensor 420 may be implemented as an absolute encoder to thereby diagnose failure of the incremental encoder. At this time, when a difference between a position value $\theta_{ie}(k)$ by the incremental encoder and a position value $\theta_{ae}(k)$ by the absolute encoder is $\varepsilon_{encoder}$ or larger, it may be determined that the encoder is failed. That is, when the following Equation 12 is satisfied, it may be determined that the encoder is failed.

$$|\theta_{ie}(k)-\theta_{ae}(k)|>\varepsilon_{encoder}$$ Equation 12:

In addition, the basic sensor 410 may be implemented as a limit sensor, and the auxiliary sensor 420 may be implemented as an absolute encoder to thereby diagnose failure of the limit sensor. A region in which the limit sensor is detected may be set in advance as a value of the absolute encoder. Whether the limit sensor is detected compared to the absolute encoder value may be periodically determined during the driving of the motor. When the limit sensor is detected outside a range of the absolute encoder value which is initially set or when the limit sensor is not detected within the range, it may be determined that the encoder is failed.

The motor control processor 225 may acquire status information (for example, a current rotation angle of the motor) of the motor through the basic sensor 410 in real time. Here, when abnormality occurs in the basic sensor 410, the motor control processor 225 may control the corresponding slave module or support to control the corresponding slave module in consideration of the status information of the motor corresponding to the corresponding slave module which has been detected through the auxiliary sensor 420 to be provided to the network processor 235 and stored in the shared memory 240 by the network processor 235 or transmitted to the motor control processor 225 from the network processor 235 via the local network.

In addition, the network processor 235 and the auxiliary sensor 420 may be electrically isolated from other components of the corresponding slave module. Accordingly, it is possible to increase the system stability in a hardware manner.

Meanwhile, the reliability of the auxiliary sensor 420 should be ensured because it should provide sensing information when abnormality occurs in the basic sensor 410, and therefore the auxiliary sensor 420 may be checked through the access to a status register of the auxiliary sensor 420 via an SPI separately from the diagnosis for the basic sensor 410, the installation status of the auxiliary sensor 420 may be determined by checking a magnetic installation status, and the status of the auxiliary sensor 420 may be checked by checking a normal operation through a PWM waveform of the auxiliary sensor 420.

Meanwhile, although abnormality does not occur in the auxiliary network or the wireless network and even in the network processor 235, the motor control processor 225, and the sensor for detecting status information of the motor corresponding to the corresponding slave module, when it is determined that a difference between a predicted status value and a current status value of the motor corresponding to the corresponding slave module exceeds a predetermined range based on a comparison result between the predicted status value transmitted from the auxiliary network master controller 120 or the wireless network master controller 130 to the auxiliary network slave controller 260 or the wireless network module 270 via the network determined that abnormality does not occur and the current status value detected through the basic sensor 410 or the auxiliary sensor 420, the master module 100 may determine that abnormality occurs in the motor corresponding to the corresponding slave module or the motor driver for driving the motor. In other words, when the following Equation 13 is satisfied, it may be determined that abnormality occurs in the motor corresponding to the corresponding slave module or the motor driver for driving the motor.

$$(\Sigma|d_{estimate}-S_{MS}|)<\varepsilon_{estimate}$$ Equation 13:

Here, $d_{estimate}$ a predicted status value of the motor over time calculated based on a target value, and $\varepsilon_{estimate}$ a cumulative maximum error between the predicted status value and the current status value of the motor.

In this manner, when it is determined that abnormality occurs in the motor corresponding to the corresponding slave module or the motor driver for driving the motor, the master module 100 may acquire current status information of the motor corresponding to the corresponding slave module from the network processor 235 via the network determined that abnormality does not occur, generate command data for controlling a different slave module in consideration of the acquired status information, and transmit the generated command data to the different slave module. Specifically, when it is determined that abnormality occurs in the motor corresponding to the corresponding slave module or the motor driver for driving the motor, the auxiliary network master controller 120 or the wireless network master controller 130 may receive current status information of the motor corresponding to the corresponding slave module, which has been acquired in the network processor 235, from the auxiliary network slave controller 260 or the wireless network module 270 via the auxiliary network or the wireless network, and the master module 100 may generate command data for controlling a different slave module in consideration of the received status information and transmit the generated command data to the different slave module.

In addition, according to the diagnosis method 2-2, although abnormality does not occur in the auxiliary network or the wireless network and even in the network processor 235, the motor control processor 225, the motor corresponding to the corresponding slave module, the motor driver 250 for driving the motor, and the sensor 410 or 420 for detecting status information of the motor, when result data A and result data B do not correspond to each other based on a comparison result between the result data A which has been supported to be executed according to the command data by the motor control processor 225 to be stored in the shared memory 240 and transmitted to the network processor 235 or has been transmitted to the network processor 235 via the local network to be transmitted to the basic network master controller 110 via the basic network, and the result data B which has been supported to be executed according to the command data by the motor control processor 225 to be stored in the shared memory 240 and transmitted to the network processor 235 or has been transmitted to the network processor 235 via the local network and provided to the auxiliary network master controller 120 or the wireless network master controller 130 via the network determined that abnormality does not occur, the master module 100 may determine that abnormality occurs in the basic network or the basic network slave controller 210.

When it is determined that abnormality occurs in the basic network or the basic network slave controller 210, the basic network master controller 110 may stop the transmission of the command data via the basic network as described above. Next, the auxiliary network master controller 120 or the wireless network master controller 130 may receive result data read from the shared memory 240 or transmitted from the motor control processor 225 via the local network, from the auxiliary network slave controller 260 or the wireless network module 270 via the network determined that abnormality does not occur. Next, the auxiliary network master controller 120 or the wireless network master controller 130 may transmit command data for continuing to control the motor corresponding to the corresponding slave module, which has been generated based on the result data, to the auxiliary network slave controller 260 or the wireless network module 270, and thereby may support the motor control processor 225 to continue to control the motor corresponding to the corresponding slave module or support the motor control processor 225 to control the motor.

Meanwhile, diagnosis for the occurrence and nonoccurrence of abnormality in the auxiliary network, the wireless network, and the motor control processor 225 may be performed in a relatively low frequency compared to diagnosis for the occurrence and nonoccurrence of abnormality in the basic sensor 410, the motor driver 250, the motors 300-1, 300-2, . . . , and 300-N, and the basic network in the above-described diagnosis method 2-2. For example, the former diagnosis may be performed every $T_{diga}$, and the latter diagnosis may be performed every $20*T_{diag}$.

Meanwhile, there may be other diagnosis methods, and this will be described briefly in the following.

Among the other diagnosis methods, there is technology for diagnosing failure of the internal components of the slave module or the motor using a variety of sensors. In this case, diagnosis for the failure may be performed by the above-described master module 100. Alternatively, the diagnosis for the failure may be performed by the motor control processor 225 or the network processor 235, the master module 100 may be notified of the diagnosis result, and the diagnosis result may be transmitted to a user. Here, a case in which the diagnosis for the failure may be performed by the motor control processor 225 or the network processor 235 will be mainly described.

First, the motor control processor 225 or the network processor 235 may monitor the output of an analog circuit of each of the one or more slave modules 200-1, 200-2, . . . , and 200-N and determine a flag which is set (or reset) when a current flowing in the motor is a maximum value or larger. When the flag is set, it may be diagnosed as overcurrent failure.

In addition, the motor control processor 225 or the network processor 235 may detect a case in which the motor corresponding to the corresponding slave module is run away independently of the command data or the motor is not smoothly driven due to external causes. When a tracking error between a command data value $\alpha_{cmd}$ and a current value $\alpha_f$ is a limit $\varepsilon_\alpha$ or larger, it may be determined that the motor is run away or the driving of the motor is failed. That is, when the following Equation 14 is satisfied, it may be determined that the motor is run away or the driving of the motor is failed.

$$|\alpha_{cmd} - \alpha_f| > \varepsilon_\alpha \qquad \text{Equation 14:}$$

In addition, the motor control processor 225 or the network processor 235 may mount a temperature sensor or a temperature detection device in the motor driver 250 that generates heat and thereby periodically monitor the output value of the temperature sensor or temperature detection device. For example, when the temperature is 100 degrees Celsius or higher, it may be diagnosed as failure.

Meanwhile, in the above-described embodiments, an example in which each of the one or more slave modules 200-1, 200-2, . . . , and 200-N includes both the auxiliary network slave controller 260 and the wireless network module 270 has been mainly described, but the technical idea of the present invention may be also applicable to a case in which each of the one or more slave modules 200-1, 200-2, . . . , and 200-N includes either the auxiliary network slave controller 260 or the wireless network module 270. When each of the one or more slave modules 200-1, 200-2, . . . , and 200-N includes only the auxiliary network slave controller 260, the master module 100 may include only the auxiliary network master controller 120, and when each of the one or more slave modules 200-1, 200-2, . . . , and 200-N includes only the wireless network module 270, the master module 100 may include only the wireless network master controller 130. However, the present invention is not limited thereto, and even in this case, the master module 100 may include both the auxiliary network master controller 120 and the wireless network master controller 130.

Hereinafter, a bumpless switching method of the motor control systems 1000-1, 1000-2, and 1000-3 according to various embodiments of the present invention will be described.

Figure 6:
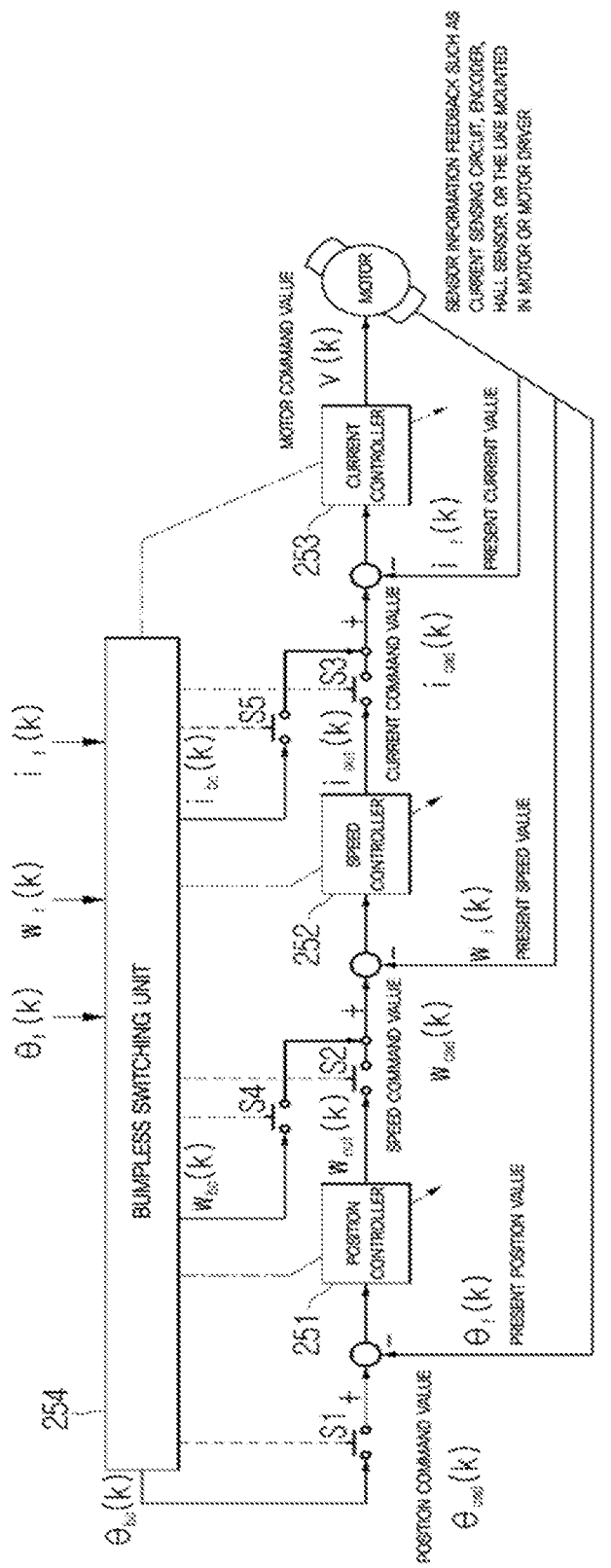
FIG. 6 is a diagram for describing a bumpless switching method of a motor control system according to an embodiment of the present invention.

FIG. 6 illustrates a bumpless switching method of a motor control system according to an embodiment of the present invention.

In FIG. 6, S1 to S5 indicates switches, solid lines indicate control command transmission paths, dotted lines indicate switch on/off command transmission paths, and alternated long and short dash lines indicate setting paths of parameter and variable values of controllers.

Referring to FIG. 6, the motor driver 250 of each of the above-described one or more slave modules 200-1, 200-2, . . . , and 200-N may include a position controller 251 that controls a position of the motor corresponding to the corresponding slave module according to a control command value in a position control mode, a speed controller 252 that controls a speed of the motor corresponding to the corresponding slave module according to a control command value in a speed control mode, a current controller 253 that controls a current of the motor corresponding to the corresponding slave module according to a control command value in a current control mode, and a bumpless switching unit 254 that transmits the control command value to each of the position controller 251, the speed controller 252, and the current controller 253. At this time, the position controller 251, the speed controller 252, and the current controller 253 may have a control phase structure in the stated order. Hereinafter, the controller having a relatively high control phase may be referred to as a high-order controller, and the controller having a relatively low control phase may be referred to as a low-order controller. The position controller 251 and the current controller 253 may be simultaneously operated for position control, the speed controller 252 and the current controller 253 and may be simultaneously operated for speed control, and the current controller 253 may be operated alone for current control. Each controller may calculate a control command value for reducing an error between the control command value and a present control value, and set the calculated control command value as the control command value of the low-order controller.

When the control mode is changed from a high-order control mode to a low-order control mode, the bumpless switching unit 254 may interrupt the output of the controller corresponding to the high-order control mode, and set a control command value for the controller corresponding to the low-order control mode as a control command value of the previous step. That is, when the control mode is changed from the high-order control mode to the low-order control mode at a time k, there may be the controller whose operation is stopped, and therefore the bumpless switching unit 254 may interrupt the output of the high-order controller whose operation is stopped, and set a control command value at the time k for the low-order controller as a control command value at a time k−1.

For example, when the control mode is changed from the position control mode to the speed control mode, the bumpless switching unit 254 may interrupt the output of the position controller 251, and set a control command value for the speed controller 252 as a control command value of the previous step. In FIGS. 6, S1 and S2 may be turned off, S3 and S4 are turned on, S5 may be turned off, and a speed command value k may be set as a speed command value k−1. That is, $\omega_{cmd}(k)=\omega_{cmd}(k-1)$ is satisfied.

Similarly, when the control mode is changed from the speed control mode to the current control mode, S1, S2, S3, and S4 may be turned off, S5 may be turned on, and current command value k=current command value k−1 may be set. That is, $i_{cmd}(k)-i_{cmd}(k-1)$ may be satisfied.

In addition, when the control mode is changed from the position control mode to the current control mode, S1, S2, S3, and S4 may be turned off, S5 may be turned on, and current command value k=current command value k−1 may be set. That is, $i_{cmd}(k)-i_{cmf}(k-1)$ may be satisfied.

Meanwhile, when the control mode is changed from the low-order control mode to the high-order control mode, the bumpless switching unit 254 may set a control command value for the controller corresponding to the high-order control mode as a present control value, and initialize an internal variable of the controller corresponding to the high-order control mode.

For example, when the control mode is changed from the speed control mode to the position control mode, the bumpless switching unit 254 may set a control command value for the position controller 251 as a present position value, and initialize an internal variable of the position controller 251. Referring to FIG. 6, S1, S2, and S3 may be turned on, S4 and S5 may be turned off, and position command value k=present position value k may be set. That is, $\theta_{cmd}(k)=\theta_f(k)$ may be satisfied. In addition, an internal variable of the position controller 251 may be initialized at a time k−1, and output value k of the position controller 251=present speed value k may be set at the time k. That is, $\omega_{out}(k)=\omega_f(k)$ may be satisfied.

In addition, when the control mode is changed from the current control mode to the speed control mode, S1 and S2 may be turned off at the time k, S3 and S4 may be turned on, S5 may be turned off, and speed command value k=present speed value k may be set. That is, $\omega_{cmd}(k)=\omega_f(k)$ may be satisfied. In addition, an internal variable of the speed controller 252 may be initialized at the time k−1, and output value k of the speed controller 252=present current value k may be set at the time k. That is, $i_{out}(k)=i_f(k)$ may be satisfied.

In addition, when the control mode is changed from the current control mode to the position control mode, S1, S2, and S3 may be turned on at the time k, S4 and S5 may be turned off, and position command value k=present position value k may be set. That is, $\theta_{cmd}(k)=\theta_f(k)$ may be satisfied. In addition, output value k of the speed controller 252=present current value k may be set. That is, $i_{out}(k)=i_f(k)$ may be satisfied. In addition, output value k of the position controller 251=present speed value k may be set. That is, $\omega_{out}(k)=\omega_f(k)$ may be satisfied. In addition, the internal variable of each of the speed controller 252 and the position controller 251 may be initialized at the time k−1.

As described above, according to the embodiments of the present invention, the network-based motor control system may continue to control the corresponding motor through a basic network and a separate auxiliary network or wireless network when a malfunction in a network node occurs while controlling each motor based on the basic network, so that the entire control system may maintain unique function and performance.

In addition, according to the embodiments of the present invention, the network-based motor control system may separately configure the motor control module and the fieldbus network module to control a motor, thereby increasing performance, stability, and reliability of the system. In addition, according to the embodiments of the present invention, the network-based motor control system may control a different module other than a specific module for controlling a specific motor in consideration of status information of the specific motor when a failure occurs in internal components of the specific module, thereby minimizing damage to the system caused by a malfunction of the specific motor.

In addition, according to the embodiments of the present invention, the network-based motor control system may control and monitor a motor in real-time through connection with an IoT infrastructure wireless network, and perform remote control through a mobile device.

In addition, according to the embodiments of the present invention, the network-based motor control system may perform bumpless switching capable of stably operating a motor without sudden discontinuous movement or impact when switching a control mode.

In addition, the above-described embodiments according to the present invention may be implemented in the form of program instructions that may be executed in various computer components and recorded on a computer-readable recording medium. The computer-readable recording medium may include program instructions, data files, data structures, and the like individually or in a combination. The program instructions recorded on the medium may be specifically designed and constructed for the present invention, and may be made publicly available to and useable by those having ordinary skill in the art of the computer software. Examples of the computer-readable recording medium include a magnetic medium such as a hard disk, a floppy disk, or a magnetic tape, an optical recording medium such as a compact disc-read only memory (CD-ROM) or a digital video disc (DVD), a magneto-optical medium such as a floptical disk, and a hardware device such as ROM, a random access memory (RAM), or a flash memory that is specially designed to store and execute program instructions. Examples of the program instructions include not only machine code generated by a compiler or the like but also high-level language codes that may be executed by a computer using an interpreter or the like. The hardware device described above may be constructed so as to operate as one or more software modules for performing the operations of the embodiments of the present invention, and vice versa.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A parallel fieldbus network-based motor control system comprising:
   one or more slave modules each comprising a basic processor and an auxiliary processor that control one or more motors and correspond to each of the one or more motors; and
   a master module comprising at least one master controller that generates command data for controlling each of the one or more motors and transmits the generated command data to each of the one or more slave modules, wherein
   the auxiliary processor acquires the command data from the master module via a basic network, and supports the acquired command data to be stored in a shared memory and transmitted to the basic processor or transmits the acquired command data to the basic processor via a local network,
   the basic processor controls the motor corresponding to the corresponding slave module in accordance with the command data acquired from the master module via the basic network, read from the shared memory, or transmitted via the local network or supports to control the motor, and supports result data executed in accordance with the command data to be stored in the shared memory and transmitted to the auxiliary processor or transmits the result data to the auxiliary processor via the local network, and
   when abnormality occurs in the basic network,
   the master module provides the command data to the basic processor or the auxiliary processor via an auxiliary network or a wireless network, and
   the auxiliary processor provides the result data to the master module via the auxiliary network or the wireless network, or acquires command data for continuing to control the motor corresponding to the corresponding slave mode from the master module and supports the acquired command data to be stored in the shared memory and transmitted to the basic processor or transmits the acquired command data to the basic processor via the local network, and wherein
   the master module includes:
   a basic network master controller that transmits the command data to each of the one or more slave modules via the basic network,
   an auxiliary network master controller that transmits the command data to each of the one or more slave modules via the auxiliary network, and
   a wireless network master controller that transmits the command data to each of the one or more slave modules via the wireless network, and
   each of the one or more slave modules includes:
   a basic network slave controller that receives, when abnormality does not occur in the basic network, the command data from the basic network master controller via the basic network and transmits the received command data to the basic processor, supports the auxiliary processor to store the command data in the shared memory and transmit the stored command data to the basic processor or supports the auxiliary processor to transmit the command data to the basic processor via the local network, and transmits result data acquired from the basic processor to the basic network master controller,
   an auxiliary network slave controller that receives, when abnormality occurs in the basic network, the command data from the auxiliary network master controller via the auxiliary network, supports the auxiliary processor to store the command data in the shared memory and transmit the stored command data to the basic processor or supports the auxiliary processor to transmit the command data to the basic processor via the local network, and transmits the result data acquired from the basic processor to the auxiliary network master controller, and
   a wireless network module that receives, when abnormality occurs in the basic network, the command data from the wireless network master controller via the wireless network, supports the auxiliary processor to store the command data in the shared memory and transmit the stored command data to the basic processor or supports the auxiliary processor to transmit the command data to the basic processor via the local network, and transmits the result data acquired from the basic processor to the wireless network master controller.

2. The parallel fieldbus network-based motor control system of claim 1, wherein, when flag information indicating occurrence of abnormality in the basic network is acquired from the basic network slave controller, the master module determines that abnormality occurs in the basic network connected to the corresponding slave module.

3. The parallel fieldbus network-based motor control system of claim 1, wherein, when initialization of the basic network is not performed within a predetermined time or the basic network master controller does not receive predetermined data in a predetermined time interval from the basic network slave controller even though the flag information indicating the occurrence of abnormality in the basic network is not acquired from the basic network slave controller, the master module determines that abnormality occurs in the basic network connected to the corresponding slave module.

4. The parallel fieldbus network-based motor control system of claim 1, wherein, when abnormality occurs in the basic network,
the basic network master controller stops transmission of the command data via the basic network, and
the auxiliary network master controller or the wireless network master controller receives result data read from the shared memory or transmitted via the local network from the auxiliary network slave controller or the wireless network module via the auxiliary network or the wireless network and transmits command data for continuing to control the motor corresponding to the corresponding slave module, which has been generated based on the result data, to the auxiliary network slave controller or the wireless network module, and thereby supports the basic processor to continue to control the motor corresponding to the corresponding slave module or supports the basic processor to control the motor.

5. The parallel fieldbus network-based motor control system of claim 4, wherein, when abnormality occurs in the basic network, the master module determines whether abnormality occurs in the auxiliary network connecting the corresponding slave module and the auxiliary network master controller or the wireless network connecting the corresponding slave module and the wireless network master controller.

6. The parallel fieldbus network-based motor control system of claim 1, wherein, when whether abnormality occurs in the auxiliary network or the wireless network is diagnosed and it is determined that abnormality does not occur in the auxiliary network or the wireless network based on the diagnosed result, the master module determines whether abnormality occurs in the basic network via the network determined that abnormality does not occur.

7. The parallel fieldbus network-based motor control system of claim 6, wherein, when flag information indicating occurrence of abnormality in the auxiliary network is acquired from the auxiliary network slave controller, the master module determines that abnormality occurs in the auxiliary network connecting the auxiliary network slave controller and the auxiliary network master controller.

8. The parallel fieldbus network-based motor control system of claim 6, wherein it is determined that abnormality occurs in the auxiliary network or the auxiliary processor when Equation 1 is satisfied, and it is determined that abnormality occurs in the auxiliary processor when Equation 2 is satisfied, $$((t_f - t_i) > T_{diag}) \&\& (|(t_f - t_{f-1}) - T_{diag}| > \varepsilon_{AN})$$ Equation 1:

$$|\Delta n_{TS,AM} * T_{TS,AM} - T_{diag}| > \varepsilon_{TS}$$ Equation 2:

wherein,
$t_i$: a time during which the auxiliary network master controller transmits data to the auxiliary network slave controller,
$t_f$: a time during which data is transmitted from the auxiliary network slave controller to the auxiliary network master controller,
$T_{diag}$: a failure diagnosis period, $$n_{TS,AM} = n_{TS,AM,f} - n_{TS,AM,f-1},$$

$n_{TS,AM,f}$: a time stamp count value of the auxiliary processor transmitted to the master module when t=f is satisfied,
$\varepsilon_{AN}$: a maximum error range between a transmission period and a reception period of the auxiliary network, and
$\varepsilon_{TS}$: a maximum error between a communication period calculated using a time stamp of the auxiliary processor and a communication period of an auxiliary network.

9. The parallel fieldbus network-based motor control system of claim 6, wherein, when abnormality occurs in the basic processor even though abnormality does not occur in the auxiliary network or the wireless network based on the diagnosed result,
the master module receives status information of the motor corresponding to the corresponding slave module, which has been acquired through a sensor, from the auxiliary processor via the network determined that abnormality does not occur, generates command data for controlling a different slave module in consideration of the received status information, and transmits the generated command data to the different slave module.

10. The parallel fieldbus network-based motor control system of claim 9, wherein it is determined that abnormality occurs in the basic processor when the following Equation is satisfied, $$|\Delta n_{TS,MM} * T_{TS,MM} - T_{diag}| > \varepsilon_{TS}$$ Equation:

wherein,
$T_{diag}$: a failure diagnosis period, $$n_{TS,MM} = n_{TS,MM,f} - n_{TS,MM,f-1},$$

$n_{TS,MM,f}$: a time stamp count value of the basic processor transmitted to the master module when $t=t_f$ is satisfied,
$T_{TS,MM}$: a period of a time stamp count, and
$\varepsilon_{TS}$: a maximum error between a communication period calculated using a time stamp of the basic processor and a communication period of the network determined that abnormality does not occur.

11. The parallel fieldbus network-based motor control system of claim 9, wherein, based on a comparison result between result data read from the shared memory or transmitted via the local network and command data transmitted from the auxiliary network master controller or the wireless network master controller to the auxiliary network slave controller or the wireless network module via the network determined that abnormality does not occur in a state in which abnormality does not occur in the auxiliary network or the wireless network and in the auxiliary processor based on the diagnosed result, when it is determined that the result data and the command data do not correspond to each other, the master module determines that abnormality occurs in the basic processor.

12. The parallel fieldbus network-based motor control system of claim 6, wherein, although abnormality does not occur in the auxiliary network or the wireless network and in the basic processor and a sensor for detecting status information of the motor corresponding to the corresponding slave module, when it is determined that a difference between a predicted status value and a current status value of the motor corresponding to the corresponding slave module exceeds a predetermined range based on a comparison result between the predicted status value of the motor corresponding to the corresponding slave module transmitted from the auxiliary network master controller or the wireless network master controller to the auxiliary network slave controller or the wireless network module via the network determined that abnormality does not occur and the current status value of the motor corresponding to the corresponding slave module detected through the sensor, the master module determines that abnormality occurs in the motor corresponding to the corresponding slave module or a motor driver for driving the motor.

13. The parallel fieldbus network-based motor control system of claim 12, wherein, when it is determined that abnormality occurs in the motor corresponding to the corresponding slave module or the motor driver for driving the motor, the master module acquires current status information of the motor corresponding to the corresponding slave module from the auxiliary processor via the network determined that abnormality does not occur, generates command data for controlling a different slave module in consideration of the acquired current status information, and transmits the generated command data to the different slave module.

14. The parallel fieldbus network-based motor control system of claim 6, wherein, although abnormality does not occur in the auxiliary network or the wireless network and even in the basic processor, the motor corresponding to the corresponding slave module, a motor driver for driving the motor, and a sensor for detecting status information of the motor, when result data A and result data B do not correspond to each other based on a comparison result between the result data A which has been executed according to the command data by the basic processor to be provided to the basic network master controller, has been supported to be executed according to the command data by the basic processor to be stored in the shared memory and transmitted to the auxiliary processor, or has been transmitted to the auxiliary processor via the local network to be provided to the basic network master controller via the basic network, and the result data B which has been supported to be executed according to the command data by the basic processor to be stored in the shared memory and transmitted to the auxiliary processor or has been transmitted to the auxiliary processor via the local network and provided to the auxiliary network master controller or the wireless network master controller via the network determined that abnormality does not occur, the master module determines that abnormality occurs in the basic network.

15. The parallel fieldbus network-based motor control system of claim 14, wherein, when abnormality occurs in the basic network,
the basic network master controller stops transmission of the command data via the basic network, and
the auxiliary network master controller or the wireless network master controller receives result data read from the shared memory or transmitted via the local network from the auxiliary network slave controller or the wireless network module via the network determined that abnormality does not occur, transmits command data for continuing to control the motor corresponding to the corresponding slave module, which has been generated based on the result data, to the auxiliary network slave controller or the wireless network module, and thereby supports the basic processor to continue to control the motor corresponding to the corresponding slave module or supports the basic processor to control the motor.

16. The parallel fieldbus network-based motor control system of claim 1, wherein the master module acquires status information of the motor corresponding to the corresponding slave module from each of a basic sensor and an auxiliary sensor, and determines that abnormality occurs in the basic sensor when a difference value between the status information acquired from the basic sensor and the status information acquired from the auxiliary sensor is a predetermined value or larger based on a comparison result therebetween.

17. The parallel fieldbus network-based motor control system of claim 16, wherein, when it is determined that abnormality occurs in the basic sensor, the basic processor controls the motor corresponding to the corresponding slave module in consideration of the status information of the motor corresponding to the corresponding slave module which has been detected through the auxiliary sensor and transmitted to the basic processor, or supports to control the motor.

18. A parallel fieldbus network-based motor control system comprising:
one or more slave modules each comprising a basic processor and an auxiliary processor that control one or more motors and correspond to each of the one or more motors; and
a master module comprising at least one master controller that generates command data for controlling each of the one or more motors and transmits the generated command data to each of the one or more slave modules, wherein
the basic processor acquires the command data from the master module via a basic network and controls the motor corresponding to the corresponding slave module or supports to control the motor, provides result data executed in accordance with the command data to the master module via the basic network, and supports the result data to be stored in a shared memory and transmitted to the auxiliary processor or transmits the result data to the auxiliary processor via a local network, and
when abnormality occurs in the basic network,
the master module provides the command data to the auxiliary processor via an auxiliary network or a wireless network, and
the auxiliary processor provides the result data read from the shared memory or transmitted via the local network to the master module via the auxiliary network or the wireless network or acquires command data for continuing to control the motor corresponding to the corresponding slave module from the master module via the auxiliary network or the wireless network, and continues to control the motor corresponding to the corresponding slave module or supports to control the motor, and wherein
the master module includes:
a basic network master controller that transmits the command data to each of the one or more slave modules via the basic network, an auxiliary network master controller that transmits the command data to each of the one or more slave modules via the auxiliary network, and a wireless network master controller that transmits the command data to each of the one or more slave modules via the wireless network, and each of the one or more slave modules includes:

a basic network slave controller that receives, when abnormality does not occur in the basic network, the command data from the basic network master controller via the basic network and transmits the received command data to the basic processor, supports the auxiliary processor to store the command data in the shared memory and transmit the stored command data to the basic processor or supports the auxiliary processor to transmit the command data to the basic processor via the local network, and transmits result data acquired from the basic processor to the basic network master controller, an auxiliary network slave controller that receives, when abnormality occurs in the basic network, the command data from the auxiliary network master controller via the auxiliary network, supports the auxiliary processor to store the command data in the shared memory and transmit the stored command data to the basic processor or supports the auxiliary processor to transmit the command data to the basic processor via the local network, and transmits the result data acquired from the basic processor to the auxiliary network master controller, and a wireless network module that receives, when abnormality occurs in the basic network, the command data from the wireless network master controller via the wireless network, supports the auxiliary processor to store the command data in the shared memory and transmit the stored command data to the basic processor or supports the auxiliary processor to transmit the command data to the basic processor via the local network, and transmits the result data acquired from the basic processor to the wireless network master controller.

19. A parallel fieldbus network-based motor control system comprising:

one or more slave modules each comprising a basic processor and an auxiliary processor that control one or more motors and correspond to each of the one or more motors; and a master module comprising at least one master controller that generates command data for controlling each of the one or more motors and transmits the generated command data to each of the one or more slave modules, wherein the network processor acquires the command data from the master module via a basic network, and supports the acquired command data to be stored in a shared memory and transmitted to the motor control processor or transmits the acquired command data to the motor control processor via a local network, the motor control processor controls the motor corresponding to the corresponding slave module in accordance with the command data read from the shared memory or transmitted via the local network or supports to control the motor, and supports result data executed in accordance with the command data to be stored in the shared memory and transmitted to the network processor or transmits the result data to the network processor via the local network, and when abnormality occurs in the basic network, the master module provides the command data to the motor control processor or the network processor via an auxiliary network or a wireless network, and the network processor provides the result data to the master module via the auxiliary network or the wireless network, or acquires command data for continuing to control the motor corresponding to the corresponding slave mode from the master module and supports the acquired command data to be stored in the shared memory and transmitted to the motor control processor or transmits the acquired command data to the motor control processor via the local network, and wherein the master module includes:

a basic network master controller that transmits the command data to each of the one or more slave modules via the basic network, an auxiliary network master controller that transmits the command data to each of the one or more slave modules via the auxiliary network, and a wireless network master controller that transmits the command data to each of the one or more slave modules via the wireless network, and each of the one or more slave modules includes:

a basic network slave controller that receives, when abnormality does not occur in the basic network, the command data from the basic network master controller via the basic network and transmits the received command data to the basic processor, supports the auxiliary processor to store the command data in the shared memory and transmit the stored command data to the basic processor or supports the auxiliary processor to transmit the command data to the basic processor via the local network, and transmits result data acquired from the basic processor to the basic network master controller, an auxiliary network slave controller that receives, when abnormality occurs in the basic network, the command data from the auxiliary network master controller via the auxiliary network, supports the auxiliary processor to store the command data in the shared memory and transmit the stored command data to the basic processor or supports the auxiliary processor to transmit the command data to the basic processor via the local network, and transmits the result data acquired from the basic processor to the auxiliary network master controller, and a wireless network module that receives, when abnormality occurs in the basic network, the command data from the wireless network master controller via the wireless network, supports the auxiliary processor to store the command data in the shared memory and transmit the stored command data to the basic processor or supports the auxiliary processor to transmit the command data to the basic processor via the local network, and transmits the result data acquired from the basic processor to the wireless network master controller.

* * * * *